United States Patent
Hu et al.

(10) Patent No.: US 11,954,863 B2
(45) Date of Patent: Apr. 9, 2024

(54) IMAGE SEGMENTATION METHOD AND APPARATUS, DIAGNOSIS SYSTEM, STORAGE MEDIUM, AND COMPUTER DEVICE

(71) Applicant: TENCENT TECHNOLOGY (SHENZHEN) COMPANY LIMITED, Shenzhen (CN)

(72) Inventors: Yifan Hu, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 512 days.

(21) Appl. No.: 17/204,894

(22) Filed: Mar. 17, 2021

(65) Prior Publication Data

US 2021/0241027 A1   Aug. 5, 2021

Related U.S. Application Data

(63) Continuation of application No. PCT/CN2019/121246, filed on Nov. 27, 2019.

(30) Foreign Application Priority Data

Nov. 30, 2018   (CN) .......................... 201811462063.3

(51) Int. Cl.
    *G06T 7/11*        (2017.01)
    *G06F 18/25*       (2023.01)
    (Continued)

(52) U.S. Cl.
    CPC .............. *G06T 7/11* (2017.01); *G06F 18/253* (2023.01); *G06N 3/045* (2023.01); *G06N 20/00* (2019.01);
    (Continued)

(58) Field of Classification Search
    CPC ..................... G06T 7/11; G06T 7/0012; G06T 2207/10088; G06T 2207/30096
    See application file for complete search history.

(56) References Cited

U.S. PATENT DOCUMENTS

2003/0142857 A1   7/2003 Alyassin
2008/0292194 A1*  11/2008 Schmidt .................. G06T 7/143
                                                                382/131
(Continued)

FOREIGN PATENT DOCUMENTS

CN        104123417 A      10/2014
CN        108268870 A      7/2018
(Continued)

OTHER PUBLICATIONS

Isensee Fabian et al.: "Brain Tumor Segmentation and Radiomics Survival Prediction: Contribution to the BRATS 2017 Challenge", Feb. 17, 2018, ICIAP: International Conference On Image Analysis and Processing, 17th International Conference, Naples, Italy, Sep. 9-13, 2013 PROCEEDINGS; (Year: 2018).*

(Continued)

*Primary Examiner* — Myron Wyche
(74) *Attorney, Agent, or Firm* — ANOVA LAW GROUP, PLLC

(57) ABSTRACT

An image segmentation method is provided for a computing device. The method includes obtaining a general tumor image, performing tumor localization on the tumor image to obtain a candidate image indicating a position of a tumor region in the general tumor image, inputting the candidate image to a cascaded segmentation network constructed based on a machine learning model, and performing image segmentation on the general tumor region in the candidate image using a first-level segmentation network and a sec- (Continued)

ond-level segmentation network in the cascaded segmentation network to obtain a segmented image.

20 Claims, 11 Drawing Sheets

(51) Int. Cl.
    *G06N 3/045*     (2023.01)
    *G06N 20/00*     (2019.01)
    *G06T 7/00*     (2017.01)
    *G06V 10/80*     (2022.01)
    *G06V 30/24*     (2022.01)

(52) U.S. Cl.
    CPC .......... *G06T 7/0012* (2013.01); *G06V 10/806* (2022.01); *G06V 30/2504* (2022.01); *G06T 2207/10088* (2013.01); *G06T 2207/30096* (2013.01)

(56) References Cited

U.S. PATENT DOCUMENTS

| | | | | |
|---|---|---|---|---|
| 2020/0020098 | A1* | 1/2020 | Odry | ................ G06V 10/7715 |
| 2021/0241027 | A1 | 8/2021 | Hu et al. | |

FOREIGN PATENT DOCUMENTS

| | | | |
|---|---|---|---|
| CN | 108492297 A | 9/2018 | |
| CN | 108564582 A | 9/2018 | |
| CN | 108765422 A | 11/2018 | |
| CN | 108830855 A | 11/2018 | |
| CN | 109271992 A * | 1/2019 | ........... G06V 10/267 |
| CN | 109598728 A | 4/2019 | |
| WO | 2018156778 A1 | 8/2018 | |

OTHER PUBLICATIONS

The World Intellectual Property Organization (WIPO) International Search Report for PCT/CN2019/121246 dated Mar. 4, 2020 5 Pages (including translation).
The State Intellectual Property Office of the People's Republic of China (SIPO) Office Action 1 for 201811462063.3 dated Jul. 19, 2019 10 Pages (including translation).
Ke Hu et al., "A 2.5D Cancer Segmentation for MRI Image Based on U-Net," 2018 5th International Conference on Information Science and Control Engineering, No. Jul. 22, 2018 (Jul. 22, 2018), pp. 6-10. 5 pages.
The European Patent Office (EPO) The Extended European Search Report for 19889004.8 dated Oct. 8, 19, 2021 7 Pages.
Ke Hu et al., "A 2.5D Cancer Segmentation for MRI Image Based on U-Net," 2018 5th international Conference on Information Science and Control Engineering, Jul. 22, 2018, pp. 6-10. 5 pages.
Fabian Isensee et al., "Brain Tumor Segmentation and Radiomics Survival Prediction: Contribution to the BRATS 2017 Challenge," Springer International Publishing AG, part of Springer Nature 2018, A. Crimi et al. (Eds.): BrainLes 2017, LNCS 10670, pp. 287-297, 2018. 11 pages.
Zichen Zhang, "Improving Semantic Image Segmentation by Object Localization," A Thesis Submitted in Partial Fulfillment of the Requirements for the Degree of Master of Science, Jan. 1, 2017 (Jan. 1, 2017), pp. 1-59. 59 pages.

* cited by examiner

IMAGE SEGMENTATION METHOD AND APPARATUS, DIAGNOSIS SYSTEM, STORAGE MEDIUM, AND COMPUTER DEVICE

RELATED APPLICATIONS

This application is a continuation application of PCT Patent Application No. PCT/CN2019/121246, filed on Nov. 27, 2019, which claims the priority to Chinese Patent Application No. 201811462063.3, entitled "IMAGE SEGMENTATION METHOD AND APPARATUS, DIAGNOSIS SYSTEM, STORAGE MEDIUM, AND COMPUTER DEVICE" and filed with the China National Intellectual Property Administration on Nov. 30, 2018, all of which are incorporated herein by reference in entirety.

FIELD OF THE TECHNOLOGY

The present disclosure relates to the field of computer technologies, and in particular, to an image segmentation method and apparatus, a diagnosis system, a storage medium, and a computing device which may be a computer.

BACKGROUND

Gliomas are common primary malignant brain tumors, also referred to as brain tumors, with varying degrees of invasiveness.

Magnetic resonance imaging (MM) has been used as a clinical method for examination and diagnosis of brain tumors. From images generated by multi-modality MM scanning, various regions of the brain tumors may be segmented for subsequent medical evaluation.

In certain existing methods, a tumor image is segmented mainly based on deep learning, for example, by using fully convolutional neural networks (FCNNs).

SUMMARY

To resolve the problem of poor effects of tumor image segmentation in the related art, embodiments of the present disclosure provide an image segmentation method and apparatus, a diagnosis system, a storage medium, and a computing device which may be a computer.

The technical solutions used in the present disclosure are as follows:

One aspect of the present disclosure provides an image segmentation method for execution by a computing device. The method includes obtaining a general tumor image, performing tumor localization on the tumor image to obtain a candidate image indicating a position of a tumor region in the general tumor image, inputting the candidate image to a cascaded segmentation network constructed based on a machine learning model, and performing image segmentation on the general tumor region in the candidate image using a first-level segmentation network and a second-level segmentation network in the cascaded segmentation network to obtain a segmented image.

Another aspect of the present disclosure provides an image segmentation apparatus. The image segmentation apparatus includes a memory storing computer program instructions, and a processor coupled to the memory and configured to executing the computer program instructions and perform obtaining a general tumor image, performing tumor localization on the tumor image to obtain a candidate image indicating a position of a tumor region in the general tumor image, inputting the candidate image to a cascaded segmentation network constructed based on a machine learning model, and performing image segmentation on the general tumor region in the candidate image using a first-level segmentation network and a second-level segmentation network in the cascaded segmentation network to obtain a segmented image.

Yet another aspect of the present disclosure provides a non-transitory computer-readable storage medium. The non-transitory computer-readable storage medium stores computer program instructions executable by at least one processor to perform obtaining a general tumor image, performing tumor localization on the tumor image to obtain a candidate image indicating a position of a tumor region in the general tumor image, inputting the candidate image to a cascaded segmentation network constructed based on a machine learning model, and performing image segmentation on the general tumor region in the candidate image using a first-level segmentation network and a second-level segmentation network in the cascaded segmentation network to obtain a segmented image.

Details of one or more embodiments of the present disclosure are provided in the accompany drawings and descriptions below.

Other aspects of the present disclosure can be understood by those skilled in the art in light of the description, the claims, and the drawings of the present disclosure.

BRIEF DESCRIPTION OF THE DRAWINGS

To more clearly describe technical solutions of certain embodiments of the present disclosure, accompanying drawings are described below. The accompanying drawings are illustrative of embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings represent same or similar elements. The accompanying drawings are not necessarily drawn to scale.

FIG. 8 is a flowchart of an embodiment of step 410 as an addition and/or alternative to the network depicted in FIG. 7a;

DETAILED DESCRIPTION

To make objectives, technical solutions, and advantages of the present disclosure clearer and more comprehensible, certain embodiments of the present disclosure are further elaborated in detail with reference to the accompanying drawings. The described embodiments are not to be construed as a limitation to embodiments of the present disclosure. All other embodiments obtained by a person of ordinary skill in the art without creative efforts shall fall within the protection scope of embodiments of the present disclosure.

The present disclosure in one or more embodiments provides an image segmentation method based on a stepwise image segmentation, which is believed to effectively improve segmentation effects in tumor image segmentation. Correspondingly, the image segmentation method is suitable for a tumor image segmentation apparatus. The tumor image segmentation apparatus may be deployed in a computing device with a Von Neumann architecture, for example, the computing device may be a personal computer (PC), a server, or the like.

The present disclosure, in one or more embodiments, offers a realization that features learned by the fully convolutional neural network method are based on a part of a general image, but the feature learning ability for the general image may be poor, which may further lead to a poor segmentation effect.

Figure 1:
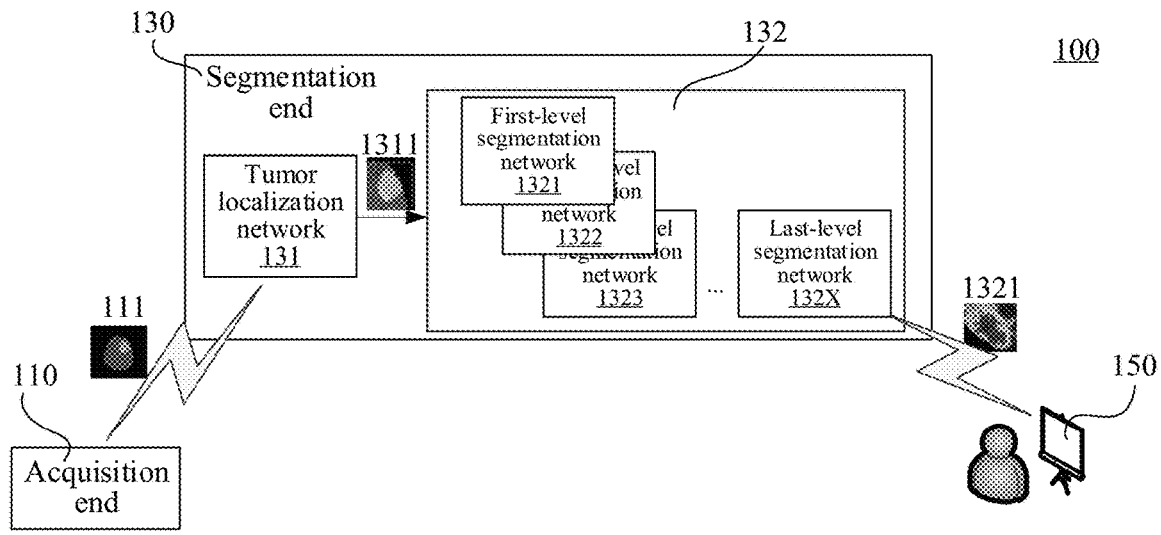
FIG. 1 is a schematic diagram of an implementation environment according to one or more embodiments of the present disclosure.

FIG. 1 is a schematic diagram of an implementation environment according to one or more embodiments of the present disclosure. The implementation environment includes a diagnosis system 100, and the diagnosis system 100 includes an acquisition end 110, a segmentation end 130, and a diagnosis end 150.

The acquisition end 110 is an electronic device for acquiring tumor images, for example, an MII device or a CT (Computed Tomography) device. This is not limited herein.

The segmentation end 130 is an electronic device for providing a background service for a user, such as, a PC or a server. The background service includes an image segmentation service.

In certain particular embodiments, and based on actual operational needs, the segmentation end 130 may be a server, or may be a server cluster composed of a plurality of servers, or even a cloud computing center composed of a plurality of servers, so as to better provide the background service for a large number of users. This is not limited herein.

Further, a tumor localization network 131 for locating a position of a general tumor region in a tumor image, and a cascaded segmentation network 132 constructed based on a machine learning model are deployed on the segmentation end 130 deploys, to implement stepwise image segmentation. The cascaded segmentation network 132 includes a plurality of levels of segmentation networks 1321, 1322, . . . , and 132X.

The diagnosis end 150 is an electronic device configured to assist a diagnostician in performing tumor diagnosis, for example, a PC equipped with a display screen.

The segmentation end 130 establishes a wireless or wired network connection to each of the acquisition end 110 and the diagnosis end 150, so as to implement data transmission in the diagnosis system 100 through the network connection. For example, this data transmission includes tumor images, segmented images, and the like.

Through interaction between the acquisition end 110 and the segmentation end 130, the acquisition end 110 transmits the acquired tumor image to the segmentation end 130.

The segmentation end 130 receives a tumor image 111 transmitted by the acquisition end 110, and performs tumor localization on the tumor image 111 based on the tumor localization network 131, and a candidate image 1311 for indicating the position of the general tumor region in the tumor image 111 is obtained, and then is inputted to the cascaded segmentation network 132.

Image segmentation is performed on the general tumor region in the candidate image 1311 starting from a first-level segmentation network 1321 in the cascaded segmentation network 132, and image segmentation is performed on an enhancing tumor core region level by level to a last-level segmentation network 132X, to obtain a segmented image 1301.

Then, the segmented image 1301 can be displayed on the display screen with which the diagnosis end 150 is equipped, so as to assist the diagnostician in performing the tumor diagnosis.

Figure 2:
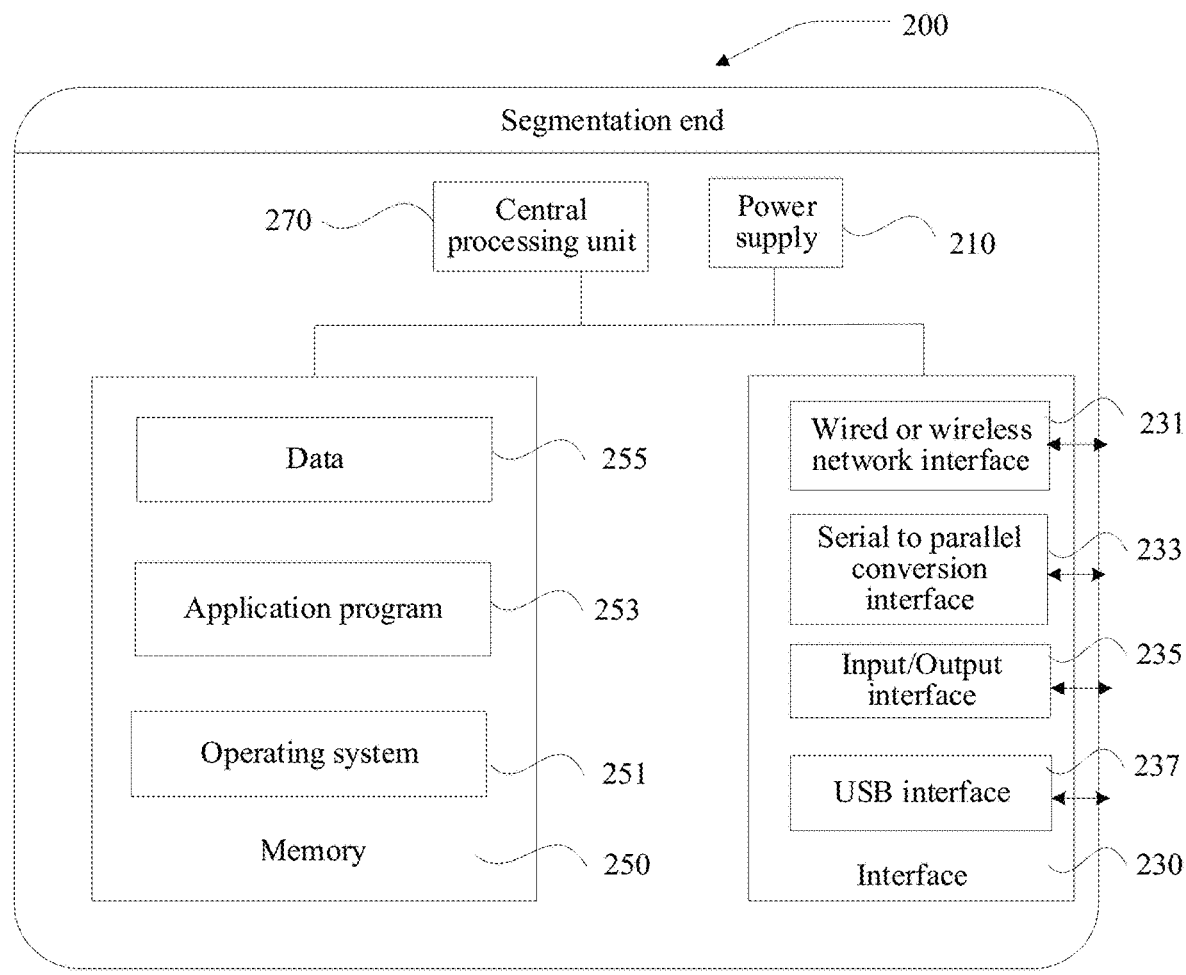
FIG. 2 is a block diagram of a hardware structure of a segmentation end according to according to one or more embodiments of the present disclosure.

FIG. 2 is a block diagram of a hardware structure of a segmentation end according to one or more embodiments of the present disclosure. The segmentation end is applicable to the segmentation end 130 of the implementation environment shown in FIG. 1.

The segmentation end is merely an example and does not limit a use range of the present disclosure. The segmentation end does not have to reply on or to have one or more components of an exemplary segmentation end 200 shown in FIG. 2.

A hardware structure of the segmentation end 200 may vary greatly as configuration or performance varies. As shown in FIG. 2, the segmentation end 200 includes: a power supply 210, an interface 230, at least one memory 250, and at least one central processing unit (CPU) 270.

In certain embodiments, the power supply 210 is configured to provide a working voltage for each hardware device on the segmentation end 200.

The interface 230 includes at least one wired or wireless network interface for interacting with external devices. For example, the wired or wireless network interface interacts with the acquisition end 110 of the implementation environment shown in FIG. 1, or interacts with the diagnosis end 150 of the implementation environment shown in FIG. 1.

In certain embodiments, the interface 230 may further include at least one serial to parallel conversion interface 233, at least one input/output interface 235, and at least one USB interface 237. As shown in FIG. 2, this is not limited herein.

The memory 250 as a carrier for resource storage can be a read-only memory, a random access memory, a magnetic disk, an optical disc, or the like. Resources stored on the memory include an operating system 251, an implementation program 253, and data 255. A storage method can be temporary storage or persistent storage.

The operating system 251 is configured to manage and control the hardware devices and the implementation program 253 on the segmentation end 200, so as to implement operations and processing of the CPU 270 on the massive data 255 in the memory 250, and may be Windows Server™, Mac OS X™, Unix™, Linux, FreeBSD™, or the like.

The implementation program 253 is a computer program that executes at least one specific task based on the operating system 251, and may include at least one module (not shown in FIG. 2), and each module may include a series of computer-readable instructions for the segmentation end 200. For example, the tumor image segmentation apparatus can be regarded as the application program 253 deployed on the segmentation end 200, to implement the image segmentation method.

The data 255 may be photos, pictures, and the like stored in the magnetic disk, or may be tumor images, segmented images, and the like stored in the memory 250.

The CPU 270 may include one or more processors, and is configured to communicate with the memory 250 by using at least one communication bus, to read computer-readable instructions stored in the memory 250, thereby implementing the operations and processing on the massive data 255 in the memory 250. For example, the image segmentation method is executed in the form of reading a series of computer-readable instructions stored in the memory 250 by using the CPU 270.

In addition, the present disclosure may alternatively be implemented through a hardware circuit or a hardware circuit in combination with software. Therefore, the present disclosure is implemented through, but not limited to, any specific hardware circuit, software, or a combination thereof.

Figure 3:
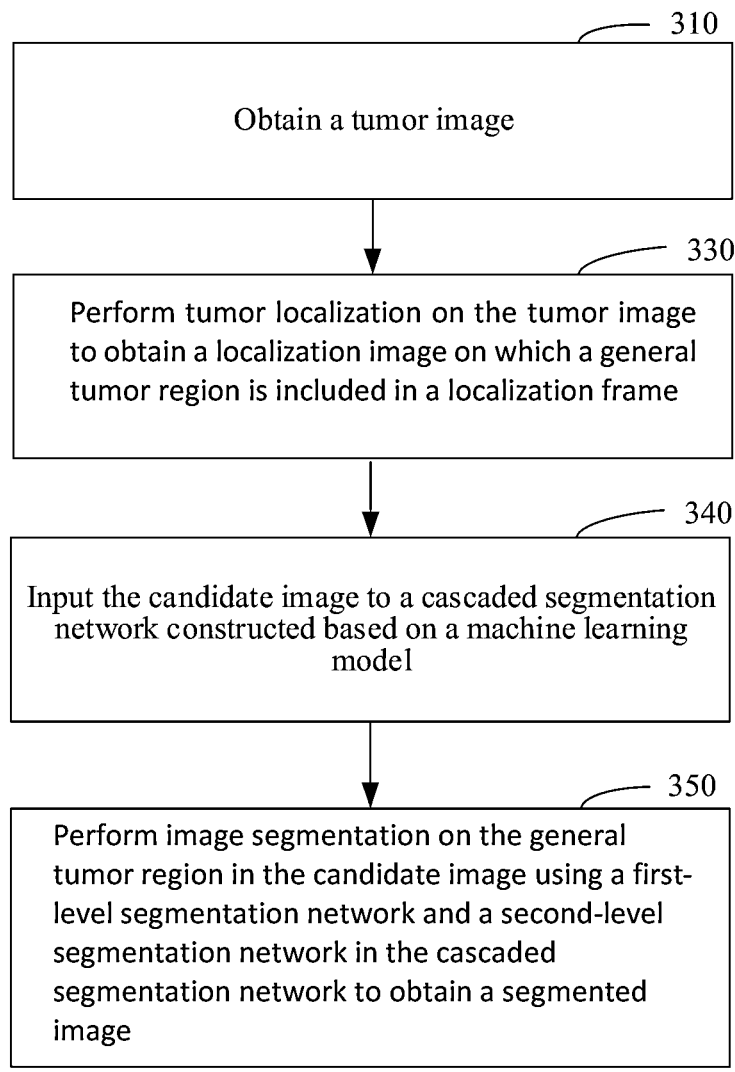
FIG. 3 is a flowchart of an image segmentation method according to according to one or more embodiments of the present disclosure.

Referring to FIG. 3, in an exemplary embodiment, an image segmentation method is applicable to the segmentation end in the implementation environment shown in FIG. 1. A structure of the segmentation end may be as shown in FIG. 2.

The image segmentation method can be performed by the segmentation end, and can include the following steps:

Step 310: Obtain a tumor image.

The tumor image is generated by the acquisition end by scanning a part where a human may have a tumor, so as to facilitate subsequent image segmentation on the tumor image. For example, the acquisition end may be an MM device, a CT device, or the like.

The tumor image may be derived from an image scanned by the acquisition end in real time, or an image pre-stored by the segmentation end and transmitted by the acquisition end. For example, the segmentation end is a server, and further the server can obtain the tumor image through local reading or network transmission.

In other words, for the obtaining of the tumor image, the image scanned by the acquisition end can be obtained in real time, to facilitate the image segmentation on the tumor image in real time, or the image scanned by the acquisition end in a historical period of time can be obtained, to help the segmentation end to perform the image segmentation on the tumor image when there are fewer processing tasks, or, the image segmentation is performed on the tumor image under an instruction of an operator. This is not specifically limited in this embodiment.

Further, after receiving the tumor image transmitted by the acquisition end, the segmentation end may perform denoising on the received tumor image, so as to improve accuracy of the subsequent image segmentation.

For example, for brain tumors, the denoising may include removing a skull and a background in the tumor image.

In certain embodiments, when the acquisition end is an MRI device, the tumor image obtained by the segmentation end includes but is not limited to one or more of four-modality MRI images, for example, FLAIR, T1, T1c, and T2.

Step 330: Perform tumor localization on the obtained tumor image, to obtain a candidate image for indicating a position of a general tumor region in the tumor image.

As described above, the brain tumors have varying degrees of invasiveness, and may be divided into three regions: a general tumor region, a tumor core region and an enhancing tumor core region. For the three regions, the most important feature is a proper inclusion relationship among the regions, as shown in sub-figures (a) to (c) in FIG. 4, that is, the general tumor region 3011 includes the tumor core region 3021, and the tumor core region 3021 includes the enhancing tumor core region 3031. In certain embodiments, the term "general tumor region" may refer to a complete tumor region or an overall tumor region.

Therefore, the tumor localization refers to localization of a rough position of the general tumor region in the tumor image, so as to accommodate the general tumor region in the candidate image according to the localized position.

In certain embodiments, the candidate image accommodates the general tumor region in the tumor image by using a designated region.

A shape of the designated region may be a rectangle, a triangle, a circle, or the like, which is not limited herein.

In an embodiment, the designated region is a rectangular frame, and a maximum size of the rectangular frame is obtained by expanding maximum values of segmentation coordinates toward the periphery by a distance of a designated number of pixel points. The designated number can be flexibly adjusted according to an actual requirement of an application scenario. For example, in an application scenario, the designated number is 5.

Figure 5:
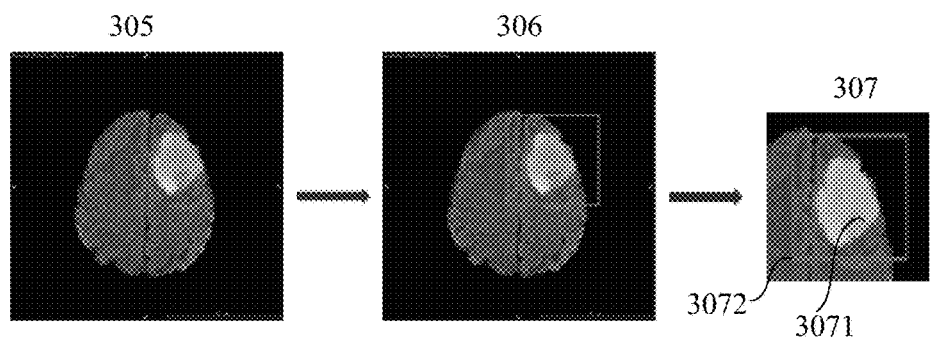
FIG. 5 is a schematic diagram of a tumor image, a tumor localization process, and a candidate image as an addition and/or alternative to the method of FIG. 3.

For example, as shown in FIG. 5, 305 represents a tumor image, 306 represents a tumor localization process, and 307 represents a candidate image. In the candidate image 307, a general tumor region 3071 is accommodated in a designated region 3072. The designated region 3072 is a rectangular frame.

That is to say, the candidate image is merely a part of the tumor image, and the candidate image accommodates the general tumor region by using the designated region, thereby indicating a rough position of the general tumor region in the tumor image, which is beneficial for subsequent finer image segmentation based on the candidate image.

Further, the tumor localization can be implemented through the image segmentation, that is, the tumor image is segmented into a general tumor region and a non-tumor region, so that a localization frame can accommodate the general tumor region obtained through segmentation.

In certain embodiments, the image segmentation includes: ordinary segmentation, semantic segmentation, instance segmentation, and the like, where the ordinary segmentation further includes: threshold segmentation, region segmentation, edge segmentation, histogram segmentation, and the like, which is not limited in this embodiment.

In an embodiment, the image segmentation can be implemented by using a machine learning model. For example, the machine learning model can be a convolutional neural network model or a residual neural network model.

Step 340: Input the candidate image to a cascaded segmentation network constructed based on a machine learning model.

Step 350: Perform image segmentation on the general tumor region in the candidate image starting from a first-level segmentation network in the cascaded segmentation network, and perform image segmentation on an enhancing tumor core region level by level to a last-level segmentation network, to obtain a segmented image.

The cascaded segmentation network includes a plurality of levels of segmentation networks, and is constructed based on the machine learning model. For example, the machine learning model can be a convolutional neural network model or a residual neural network model.

For the segmentation networks at all levels in the cascaded segmentation network, based on a first-level segmentation network and parameters thereof, image segmentation is performed on the general tumor region in the candidate image, and a segmentation result is outputted to a second-level segmentation network.

Based on the second-level segmentation network and parameters thereof, image segmentation is performed on the segmentation result outputted by the first-level segmentation network, and a segmentation result is outputted to a third-level segmentation network; and image segmentation is performed on an enhancing tumor core region level by level to a last-level segmentation network, and a segmentation result of the last-level segmentation network is used as a segmented image.

Therefore, stepwise image segmentation that starts from a boundary position of the general tumor region in the candidate image and gradually proceeds inward to the enhancing tumor core region is implemented.

As described above, the brain tumors may be divided into a general tumor region, a tumor core region, and an enhancing tumor core region. Therefore, in an embodiment, a cascaded segmentation network includes three levels of segmentation networks.

Figure 6:
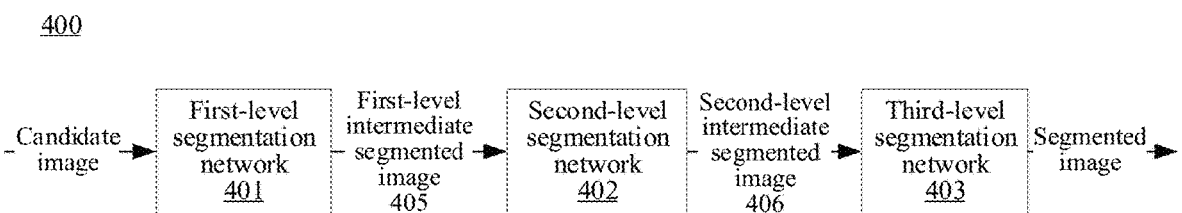
FIG. 6 is a schematic structural diagram of the cascaded segmentation network as an addition and/or alternative to the method of FIG. 3.

As shown in FIG. 6, a cascaded segmentation network 400 includes a first-level segmentation network 401, a second-level segmentation network 402, and a third-level segmentation network 403.

In certain embodiments, image segmentation is performed on the candidate image by using the first-level segmentation network 401, to obtain a first-level intermediate segmented image 405.

Image segmentation is performed on the first-level intermediate segmented image 405 by using the second-level segmentation network 402, to obtain a second-level intermediate segmented image.

Image segmentation is performed on the second-level intermediate segmented image 406 by using the third-level segmentation network 403, to obtain the segmented image.

Figure 4:
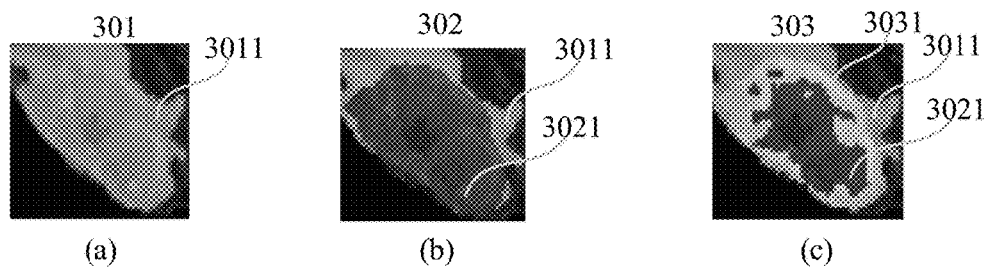
FIG. 4 is a schematic diagram of segmentation results of segmentation networks in a cascaded segmentation network as an addition and/or alternative to the method of FIG. 3.

As shown in sub-figures (a) to (c) in FIG. 4, a first-level intermediate segmented image 301 is a segmentation result of the first-level segmentation network 401, and the general tumor region 3011 included in the image is marked, as shown in sub-figure (a) in FIG. 4.

A second-level intermediate segmented image 302 is a segmentation result of the second-level segmentation network 402, and the general tumor region 3011 and the tumor core region 3021 in the image are marked differently to reflect a proper inclusion relationship between the general tumor region 3011 and the tumor core region 3021, as shown in sub-figure (b) in FIG. 4.

A segmented image 303 is a segmentation result of the third-level segmentation network 403, and the general tumor region 3011, the tumor core region 3021, and the enhancing tumor core region 3031 included in the image are marked differently, as shown in the sub-figure (c) in FIG. 4. That is, the segmented image 303 reflects a proper inclusion relationship among the general tumor region 3011, the tumor core region 3021, and the enhancing tumor core region 3031.

In certain embodiments, in stepwise image segmentation, parameters used by the segmentation networks at all levels are different, so as to better adapt to the image segmentation between different regions included in brain tumors, to further help to improve segmentation effects of the tumor image.

By using the foregoing process, the tumor image segmentation based on machine learning is implemented, and the segmentation effects of the tumor image are effectively improved by using image segmentation processes of different scales.

Figure 7A:
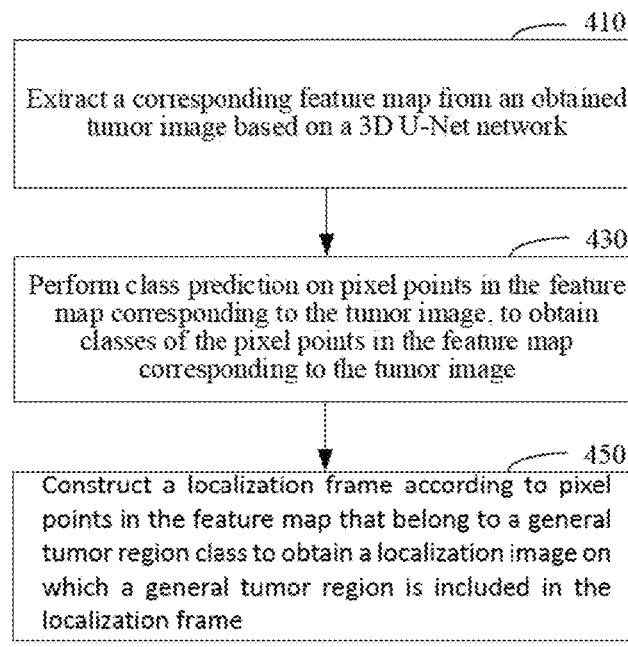
FIG. 7a is a flowchart of an embodiment of step 330 as an addition and/or alternative to the method of FIG. 3.

Referring to FIG. 7a, in an exemplary embodiment, step 330 may include the following steps:

Step 410: Extract a corresponding feature map from the obtained tumor image based on a three-dimensional U-shaped fully convolutional neural network (3D U-Net).

It is to be understood that the tumor image generated by scanning of the acquisition end is usually a three-dimensional image, that is, a tumor image composed of many slices. If a two-dimensional machine learning model is used for processing a three-dimensional tumor image, not only a segmentation effect is not good, but also segmentation efficiency is relatively low because each of the slices that constitute the tumor image needs to be inputted to the machine learning model for training or class prediction, which is excessively cumbersome.

Therefore, in this embodiment, tumor localization is implemented by using a three-dimensional machine learning model, that is, a 3D U-Net network.

The 3D U-Net network is also referred to as a three-dimensional U-Net-based network. It can be understood that the 3D U-Net network is constructed by using the U-Net-based network as a prototype, and also has a U-shaped network structure.

Figure 7B:
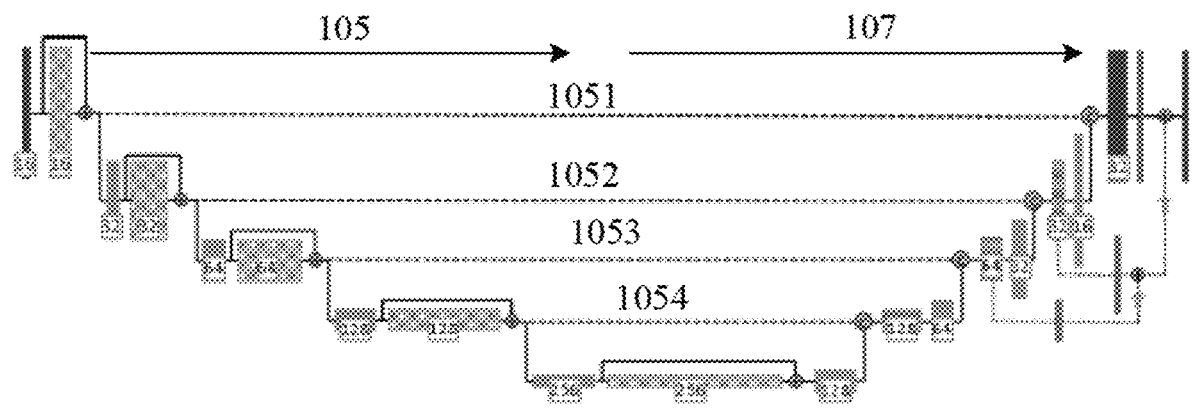
FIG. 7b is a schematic structural diagram of a U-Net-based network according to one or more embodiments of the present disclosure.

Referring to a U-Net-based network shown in FIG. 7b, the U-Net-based network is an improved fully convolutional neural network. The U-Net-based network includes a contracting path 105 and an expanding path 107. An input image is convoluted a plurality of times and contracted through the contracting path 105 to obtain a plurality of feature maps, and then the contracted input image is deconvoluted a plurality of times and expanded through the expanding path 107. In this process, the input image is further correspondingly merged with the plurality of feature maps obtained by using the contracting path 105, as shown in 1051-1054 in FIG. 7b, so as to obtain features in different dimensions of the input image, thereby improving the segmentation effects.

In certain embodiments, the 3D U-Net network includes an encoder network and a decoder network.

The encoder network is used for extracting context features of the tumor image, so as to accurately describe the tumor image locally/globally by using the context features, to capture context information in the tumor image. The decoder network is used for extracting localization features of the tumor image, so as to perform, by using the localization features, accurate localization on a region in the tumor image on which image segmentation needs to be performed.

In addition, in the decoder network, feature fusion of the context features and the localization features is further performed, to obtain features in different dimensions of the tumor image, so that the segmentation effects of the image segmentation are better.

Step 430: Perform class prediction on pixel points in the feature map corresponding to the tumor image, to obtain classes of the pixel points in the feature map corresponding to the tumor image.

In this embodiment, the class prediction is implemented based on a classifier that is set in the 3D U-Net network, that is, probabilities that the pixel points in the feature map corresponding to the tumor image belong to different classes are calculated by using the classifier.

As described above, the tumor localization is essentially first segmenting the tumor image into a tumor region and a non-tumor region. Therefore, the classes include a general tumor region class and a non-tumor region class.

For example, for a pixel point in the feature map corresponding to the tumor image, probabilities that the pixel point belongs to different classes are calculated respectively. Assuming that a probability that the pixel point belongs to the general tumor region class is P1 and a probability that the pixel point belongs to the non-tumor region class is P2, if P1>P2, it indicates that the pixel point belongs to the general tumor region class; otherwise, if P1<P2, it indicates that the pixel point belongs to the non-tumor region class.

After the class prediction of all pixel points in the feature map corresponding to the tumor image is performed, segmentation of the tumor region and the non-tumor region in the tumor image is performed, that is, a rough position of the general tumor region is localized in the tumor image.

Step 450: Obtain the candidate image on which the general tumor region is accommodated in a designated region according to pixel points belonging to a general tumor region class in the feature map.

After the classes of all the pixel points in the feature map corresponding to the tumor image are obtained, the pixel points belonging to the general tumor region class can be obtained, so as to construct a designated region based on the obtained pixel points.

In other words, the pixel points belonging to the general tumor region class are enclosed within the designated region, that is, the general tumor region is regarded to be accommodated in the designated region, so that a candidate image on which the general tumor region is accommodated in the designated region is generated, as shown by 307 in FIG. 5.

In certain embodiments, considering different degrees of invasiveness of brain tumors, in a process of constructing the designated region, the designated region is used as a center, and expansion is made toward the periphery, so that a size of the candidate image reaches a designated size, so as to fully ensure the segmentation effects of the tumor image.

The designated size may be flexibly set according to an actual requirement of an application scenario, which is not limited in this embodiment. For example, in an application scenario, the designated size is 96×96×96.

Under the effect of the foregoing embodiment, coarse segmentation on the tumor image is implemented based on the 3D U-Net network, which not only localizes the rough position of the general tumor region in the tumor image from a macro perspective, avoiding a loss of accuracy of the image segmentation, but also contracts the tumor image to the candidate image, effectively reducing the size of the image, thereby not only reducing a background proportion, helping to improve a segmentation granularity of small tumors, but also helping to design a deeper network, and further improving the segmentation effects.

In addition, by using the coarse segmentation on the tumor image, a size of the designated region can dynamically change with a size of the general tumor region, which helps to fully guarantee the balance between positive and negative samples during subsequent model training of the segmentation network.

Figure 8:
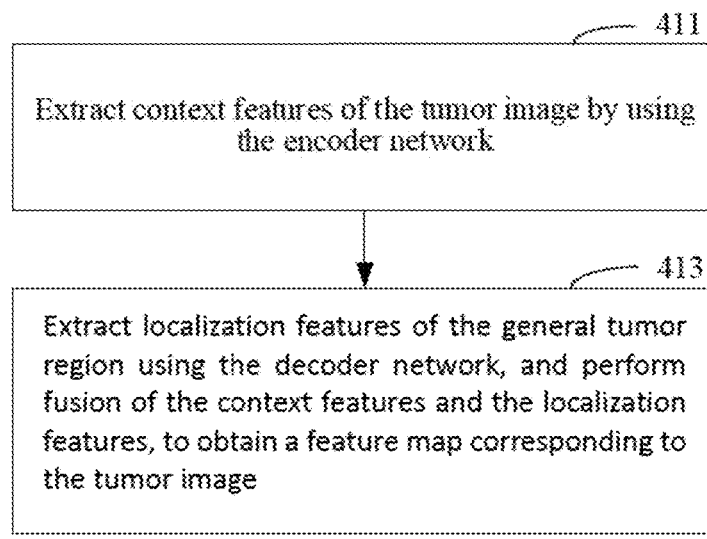

Referring to FIG. 8, in an exemplary embodiment, step 410 may include the following steps:

Step 411: Extract context features of the tumor image by using the encoder network.

Figure 9:
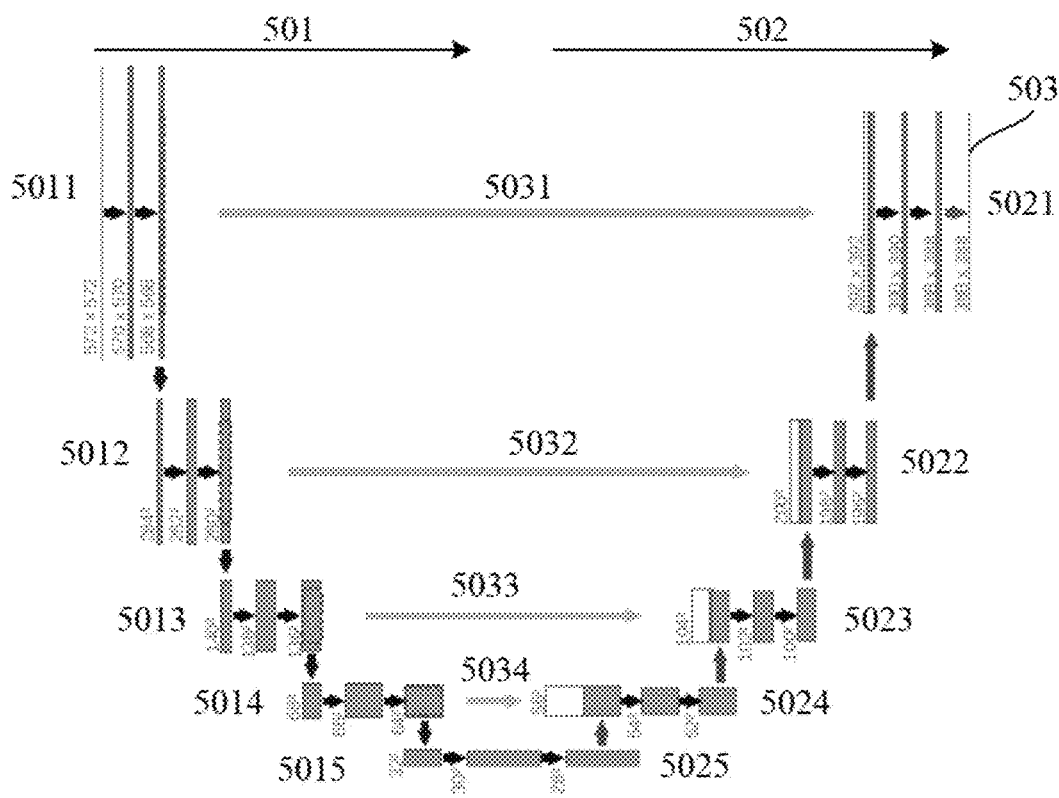
FIG. 9 is a schematic diagram of a network structure of a 3D U-Net network as an addition and/or alternative to the network depicted FIG. 8.

As shown in FIG. 9, a 3D U-Net network 500 includes an encoder network 501 and a decoder network 502.

In ascending order of depth, the encoder network 501 includes several downsampling layers 5011-5015, and the decoder network 502 includes several upsampling layers 5021-5025.

Between the encoder network 501 and the decoder network 502, in ascending order of depth, several feature propagation layers 5031-5034 are established.

It is worth mentioning that, the 3D U-Net network 500 further includes a classification layer 503, equipped with a classifier, configured to calculate probabilities that pixel points in the feature map corresponding to the tumor image belong to different classes, so as to implement the class prediction on the pixel points in the feature map corresponding to the tumor image.

Then, the encoder network 501 can extract the context features of the tumor image by using the several downsampling layers 5011-5015, and transmit the extracted context features to the decoder network 502 by using the several feature propagation layers 5031-5034.

In certain embodiments, the tumor image is inputted to a shallowest downsampling layer 5011 in the encoder network 501, convolution is performed on the inputted tumor image by using the shallowest downsampling layer 5011, to obtain local features corresponding to the shallowest downsampling layer 5011, and the local features are downsampled and then inputted to a second shallowest downsampling layer 5012.

In ascending order of depth, the downsampling layers 5012, 5013, and 5014 in the encoder network 501 are traversed, to obtain local features corresponding to the traversed downsampling layers 5012, 5013, and 5014.

Between the encoder network 501 and the decoder network 502, feature propagation of the foregoing local features is performed respectively by using the several feature propagation layers 5031-5034.

By using convolution of a deepest downsampling layer 5015, global features corresponding to the deepest downsampling layer 5015 are obtained and directly transmitted to a deepest upsampling layer 5025 in the decoder network 502.

In the encoder network 501, horizontal arrows represent convolution, and downward arrows represent downsampling.

Regardless of whether a feature is a local feature or a global feature, the feature is regarded as a context feature of the tumor image, so as to accurately describe the tumor image locally/globally.

That is to say, as the encoder network deepens in level, in feature extraction on the tumor image, global description is gradually abstracted from local description, and further the tumor image is described more accurately, thereby helping to ensure the accuracy of image segmentation.

Step 413: Extract localization features of the general tumor region by using the decoder network, and perform fusion of the context features and the localization features, to obtain a feature map corresponding to the tumor image.

The decoder network not only extracts the localization features of the tumor image by using the several upsampling layers, but also performs feature fusion of the context features and the localization features for the tumor image.

With reference to FIG. 9, feature extraction and feature fusion processes of the decoder network are described.

In certain embodiments, in the decoder network 502, context features (global features) corresponding to the deepest downsampling layer 5015 in the encoder network 501 are used as localization features corresponding to the deepest upsampling layer 5025.

Upsampling is performed on the localization features corresponding to the deepest upsampling layer 5025, to obtain to-be-fused features.

The to-be-fused features are inputted to a second deepest upsampling layer 5024, and fused with context features (local features) corresponding to a second deepest downsampling layer 5014, and by using deconvolution, localization features corresponding to the second deepest upsampling layer 5024 are obtained.

In descending order of depth, the other upsampling layers 5023, 5022, 5021 are traversed, to obtain localization features corresponding to the traversed upsampling layers.

After the traversal is performed, a feature map corresponding to the tumor image is obtained according to the localization features corresponding to the shallowest upsampling layer 5021.

In the decoder network 502, horizontal arrows represent deconvolution, and upward arrows represent upsampling.

Through the foregoing process, by using a mutual combination of the encoder network and the decoder network, not only a calculation amount of image segmentation is effectively reduced, to help to improve the segmentation efficiency, but also the accuracy of image segmentation is fully ensured.

It is to be understood that principles of the image segmentation processes performed by the segmentation networks at all levels are the same. Differences only lie in different input objects and output objects, and different used parameters. Therefore, before the image segmentation is further described in detail, the differences among the image segmentation processes performed based on the segmentation networks at all levels are defined and explained below, so as to subsequently better describe commonalities among the image segmentation processes performed based on the segmentation networks at all levels.

An input image is the candidate image, the first-level intermediate segmented image, or the second-level intermediate segmented image.

An output image is the first-level intermediate segmented image, the second-level intermediate segmented image, or the segmented image.

A segmentation network is the segmentation networks at all levels in the cascaded segmentation network. Parameters of the segmentation network are parameters of the segmentation networks at all levels in the cascaded segmentation network.

Figure 10:
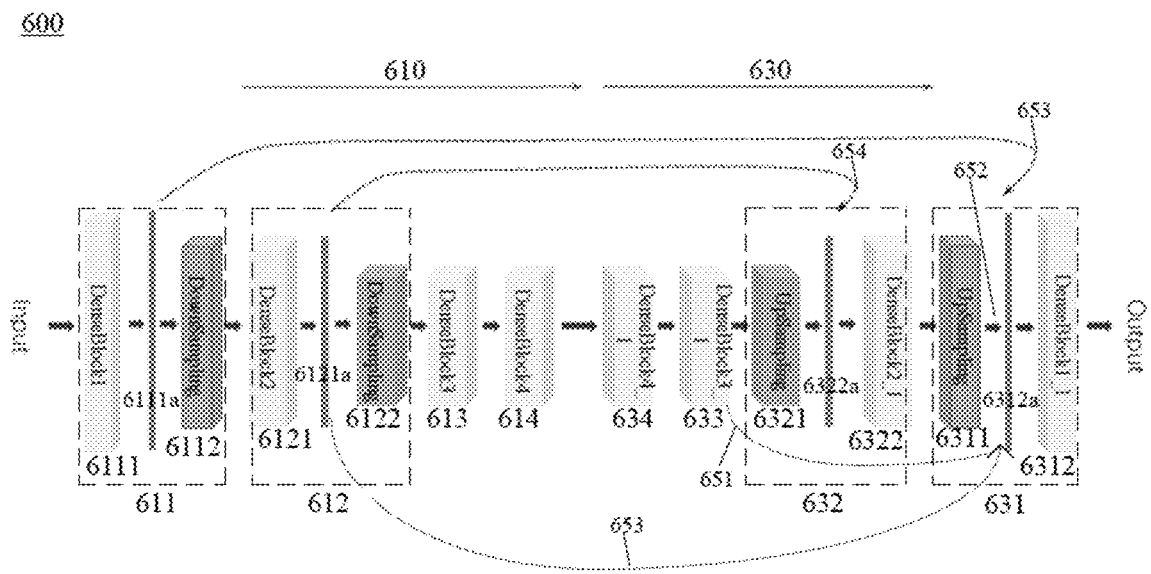
FIG. 10 is a schematic diagram of a network structure of a segmentation network according to one or more embodiments of the present disclosure.

As shown in FIG. 10, the segmentation network 600 includes a downsampling stage 610 and an upsampling stage 630.

In certain embodiments, the downsampling stage 610 includes several first basic network layers 611 and 612 and several first dense block layers 613 and 614 connected sequentially.

The upsampling stage 630 includes several third dense block layers 634 and 633 and several second basic network layers 632 and 631 connected sequentially. The upsampling stage 630 and the downsampling stage 610 are symmetric to each other, including: the first basic network layer 611 and the second basic network layer 631 are symmetric to each other, the first basic network layer 612 and the second basic network layer 632 are symmetric to each other, the first dense block layer 613 and the third dense block layer 633 are symmetric to each other, and the first dense block layer 614 and the third dense block layer 634 are symmetric to each other.

The first basic network layer 611 includes a second dense block layer 6111 and a pooling layer 6112 connected sequentially. The first basic network layer 612 includes a second dense block layer 6121 and a pooling layer 6122 connected sequentially.

The second basic network layer 631 includes an upsampling layer 6311 and a fourth dense block layer 6312 connected sequentially. The second basic network layer 632 includes an upsampling layer 6321 and a fourth dense block layer 6322 connected sequentially.

Correspondingly, based on mutual symmetry between the upsampling stage 630 and the downsampling stage 610, the second dense block layer 6111 and the fourth dense block layer 6312 are symmetric to each other, and the second dense block layer 6121 and the fourth dense block layer 6322 are symmetric to each other.

Further, each of the above dense block layers includes an input unit and at least one dense unit. Each dense unit further includes a convolution layer, an activation layer, and a normalization layer connected sequentially, avoiding using a pure convolution layer or residual convolution layer, to ensure the accuracy of image segmentation.

Figure 11:
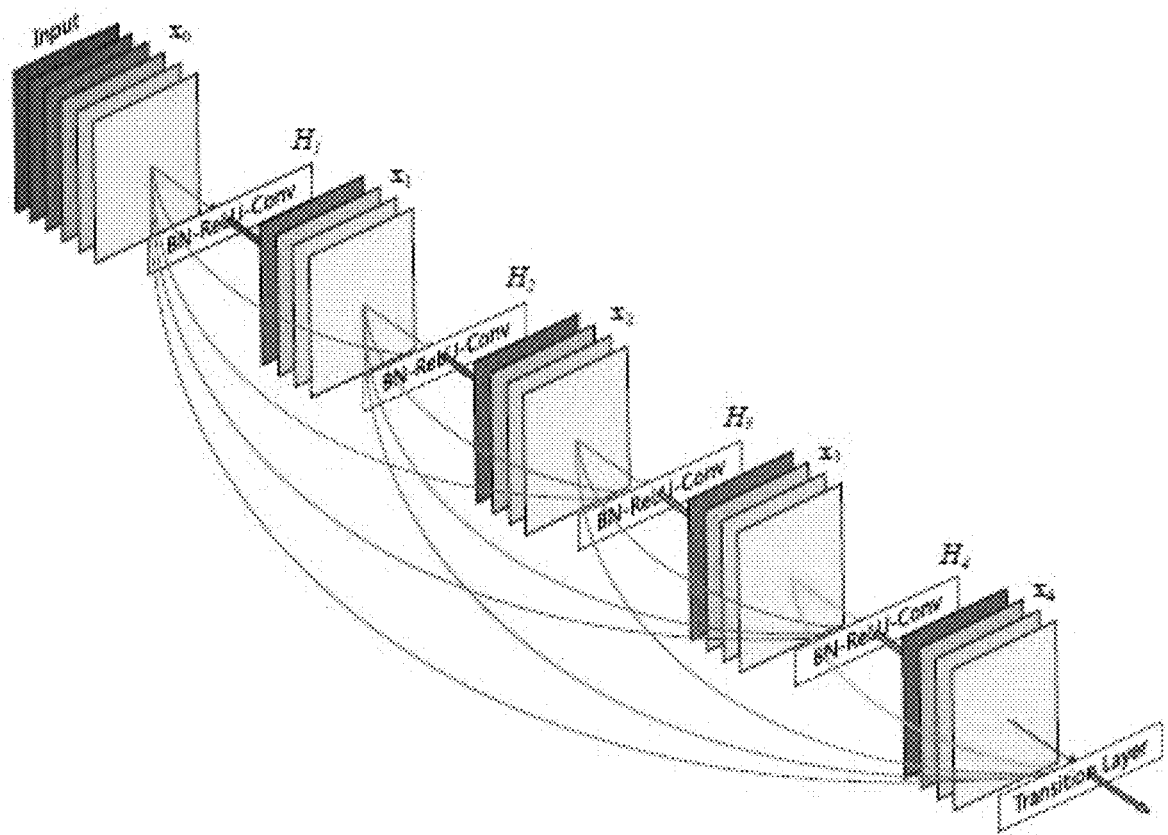
FIG. 11 is a schematic structural diagram of a dense block layer as an addition and/or alternative to the network depicted in FIG. 10.

As shown in FIG. 11, the dense block layer includes one input unit and four dense units H1, H2, H3, and H4. Each of the dense units further includes a convolution layer Cony, an activation layer Relu, and a normalization layer BN.

A feature x0 corresponding to the input image Input is inputted by the input unit and simultaneously outputted to the dense units H1, H2, H3, and H4. In addition, when feature extraction is performed on the input image Input, a feature x1 outputted by the dense unit H1 is simultaneously outputted to the dense units H2, H3, and H4. Similarly, a feature x2 outputted by the dense unit H2 is simultaneously outputted to the dense units H3 and H4, and a feature x3 outputted by the dense unit H3 is outputted to the dense unit H4.

In other words, for the dense unit H2, the features x0 and x1 corresponding to the input image Input are combined. For the dense unit H3, the features x0, x1, and x2 corresponding to the input image Input are combined. For the dense unit H4, the features x0, x1, x2, and x3 corresponding to the input image Input are combined.

Through such setting, the dense block layer can not only reuse features of shallow layers, such as x0 and x1, to fully ensure integrity of the input image, but also combine features of deep and shallow layers, such as x0, x1, and x2, which helps to reduce complexity of image segmentation, and further effectively improves the segmentation effects of image segmentation.

Still further, each convolution layer in the first dense block layer and the third dense block layer includes several three-dimensional convolution kernels (not shown in FIG. 10).

Each convolution layer in the second dense block layer and the fourth dense block layer includes several tangent convolution kernels (not shown in FIG. 10) and several normal convolution kernels, as shown by 6111a, 6121a, 6322a, and 6312a in FIG. 10. In other words, the convolution layer in the second dense block layer and the fourth dense block layer transforms the several three-dimensional convolution kernels (k×k×k) into the several tangent convolution kernels (k×k×1) and the several normal convolution kernels (1×1×k).

Through such setting, 2.5-dimensional-based image segmentation is implemented, which can avoid high video memory occupation and computational complexity of the three-dimensional convolution kernel. In addition, more importantly, the tumor image is particular, that is, the tumor image is composed of numerous slices, resulting in a relatively large difference between a tangent resolution and a normal resolution when the numerous slices synthesize a three-dimensional image. An error of pure three-dimensional image segmentation is relatively large, and pure two-dimensional segmentation directly ignores a correlation between the locality and the globality of the image, so that only 2.5-dimensional tumor image segmentation is most suitable.

In addition, as shown in FIG. 10, through a mutual combination of three-dimensional characteristics of the first dense block layer and the third dense block layer, and 2.5-dimensional characteristics of the second dense block layer and the fourth dense block layer, not only respective advantages of the former and the latter are integrated, but also features of each dimension of the input image are integrated on the basis of the latter, ensuring maximal collection and fusion of features, and further effectively improving the segmentation effects of image segmentation.

Figure 12:
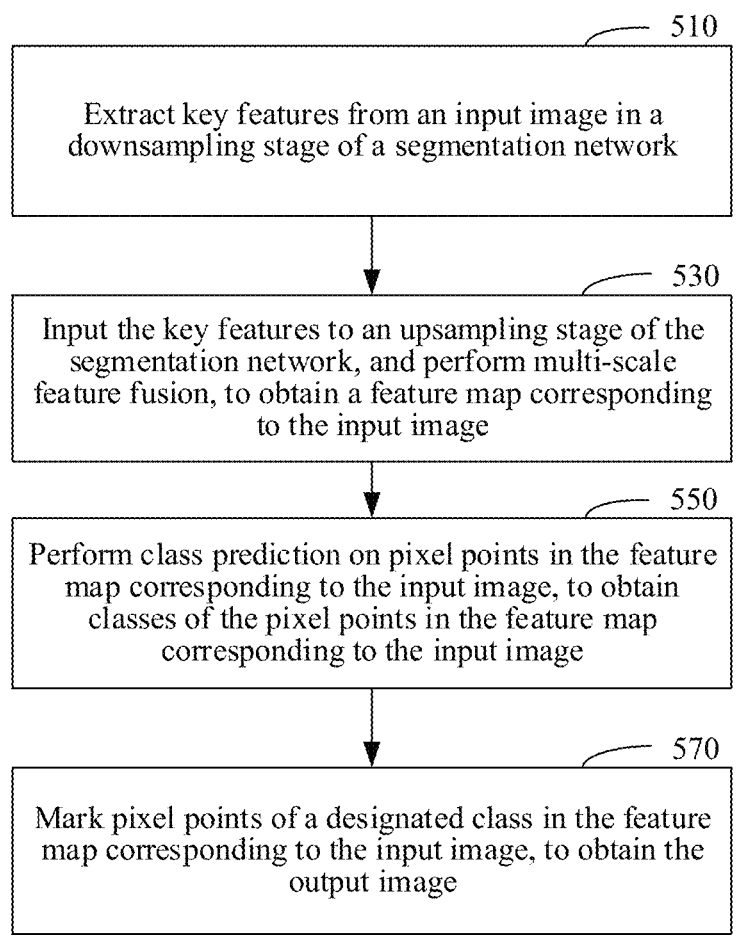
FIG. 12 is a flowchart of an image segmentation process according to one or more embodiments of the present disclosure.

Correspondingly, in an exemplary embodiment, as shown in FIG. 12, the image segmentation process, that is, performing image segmentation on the input image by using the segmentation network, to obtain the output image may include the following steps:

Step 510: Extract key features from the input image in the downsampling stage of the segmentation network.

With reference to FIG. 10, the process of extracting key features is described.

In certain embodiments, the input image Input is inputted to the downsampling stage 610 of the segmentation network 600, and convolution and downsampling is performed by using the several first basic network layers 611 and 612 to obtain intermediate features.

Then, after the intermediate features are obtained, convolution can be performed on the intermediate features by using the several first dense block layers 613 and 614, to obtain the key features.

A process of obtaining intermediate features is further described as follows:

In the downsampling stage 610 of the segmentation network 600, the input image Input is inputted to a first first basic network layer 611, and convolution is performed on the input image by using the second dense block layer 6111 in the first first basic network layer 611.

Downsampling is performed on features outputted after the convolution by using the pooling layer 6112 in the first first basic network layer 611, so as to output the downsampled features to a second first basic network layer 612.

The other first basic network layers 612 in the several first basic network layers are traversed according to a feature propagation sequence. After the traversal is performed, features downsampled by the second first basic network layer 612, that is, a last first basic network layer 612 are used as the intermediate features.

Step 530: Input the key features to the upsampling stage of the segmentation network, and perform multi-scale feature fusion, to obtain a feature map corresponding to the input image.

With reference to FIG. 10, a process of the multi-scale feature fusion is described.

In certain embodiments, the key features are inputted to the upsampling stage 630 of the segmentation network 600, and deconvolution is performed by using the several third dense block layers 634 and 633, to obtain first scale features 651, to input the first scale features to the first several second basic network layers.

In the first several second basic network layers, feature fusion of fourth dense block layers in the first several second basic network layers and second dense block layers in several of the first basic network layers that are symmetric each other is performed, and the first several second basic network layers in the upsampling stage 630 are connected between a last third dense block layer 633 and a last second basic network layer 631.

In the last second basic network layer 631, upsampling is performed on features outputted after the fusion in the first several second basic network layers by using the upsampling layer 6311 in the last second basic network layer 631, to obtain second scale features 652.

Features outputted after the convolution by the second dense block layers 6111 and 6121 in the several first basic network layers 611 and 612 are obtained, and the obtained features are used as third scale features 653.

Fusion is performed on the first scale features 651, the second scale features 652, and the third scale features 653 by using the fourth dense block layer 6312 in the last second basic network layer 631, and deconvolution is performed, to obtain a feature map Output corresponding to the input image Input.

That is, the feature map Output corresponding to the input image Input is not only based on 1× upsampling features (the second scale features 652), 2× upsampling features (the features 653 outputted after the convolution of the second dense block layer 6121), and 4× upsampling features (the first scale features 651), but also based on zero upsampling features (the features 653 outputted after the convolution of the second dense block layer 6111), thereby implementing multi-scale feature fusion, so that segmentation results of the segmentation networks at all levels can achieve the best segmentation effects locally and globally, which effectively improves the segmentation effects.

A process of the feature fusion of the fourth dense block layer and the second dense block layer that are symmetric to each other is further described as follows:

The first scale features 651 are inputted to the first second basic network layer 632, and upsampling is performed on the inputted first scale features 651 by using an upsampling layer 6321 in the first second basic network layer 632.

Based on a fourth dense block layer 6322 in the first second basic network layer 632, features 654 outputted after the convolution of a second dense block layer 6121 in the several first basic network layers 612 that is symmetric to the fourth dense block layer are obtained, and fused with the upsampled features, to obtain combined features.

Deconvolution is performed on the combined features by using the fourth dense block layer 6322 in the first second basic network layer 632, to output the deconvoluted features to the second second basic network layer 631.

The other second basic network layers in the first several second basic network layers are traversed according to a feature propagation sequence, and after the traversal is performed, feature fusion of the fourth dense block layers and the second dense block layers that are symmetric to each other is performed.

Because FIG. 10 only includes two second basic network layers, in the upsampling stage 630, the second second basic network layer is essentially the last second basic network layer. Therefore, there is no need to traverse the other second basic network layers in the first several second basic network layers, and provided that deconvolution performed in the first second basic network layer 632 is performed, feature fusion of the fourth dense block layer 6322 and the second dense block layer 6121 that are symmetric to each other is performed.

Step 550: Perform class prediction on pixel points in the feature map corresponding to the input image, to obtain classes of the pixel points in the feature map corresponding to the input image.

In this embodiment, the class prediction is implemented based on a classifier that is set in the segmentation network, that is, probabilities that pixel points in the feature map corresponding to the input image belong to different classes are calculated by using the classifier.

The classes can be an other-regions class, a general tumor region class, a tumor core region class, and an enhancing tumor core region class.

The segmentation networks at all levels are constructed based on two classes, that is, in the first-level segmentation network, the classes include the other-regions class and the general tumor region class. In this case, the other regions are non-tumor regions.

Similarly, in the second-level segmentation network, the classes include the other-regions class and the tumor core region class. In this case, the other regions refer to the non-tumor regions and the general tumor region that does not include the tumor core region.

In the third-level segmentation network, the classes include the other-regions class and the enhancing tumor core region class. In this case, the other regions refer to the non-tumor regions and the general tumor region that does not include the enhancing tumor core region.

Image segmentation of the other regions and the tumor core region performed in the second-level segmentation network is used as an example for description.

For a pixel point in the feature map corresponding to the input image, probabilities that the pixel point belongs to different classes are respectively calculated. Assuming that a probability that the pixel point belongs to the other-regions class is P1 and a probability that the pixel point belongs to the tumor core region class is P2, if P1 is greater, it indicates that the pixel point belongs to the other-regions class; otherwise, if P2 is greater, it indicates that the pixel point belongs to the tumor core region class.

Step 570: Mark pixel points of a designated class in the feature map corresponding to the input image, to obtain the output image.

Marking is performed according to the class to which the pixel point belongs. The marking can be made by using a color or a symbol such as an asterisk, which is not limited herein.

In an embodiment, different classes of pixel points are marked with different colors, as shown in sub-figure (c) in FIG. 4.

It is worth mentioning that in the segmentation networks at all levels, designated classes are all different. For example, in the first-level segmentation network, the designated class is the general tumor region class; in the second-level segmentation network, the designated class is the tumor core region; and in the third-level segmentation network, the designated class is the enhancing tumor core region.

For the segmentation networks at all levels, provided that the class prediction of all the pixel points in the feature maps corresponding to all the input images is performed, the segmentation of the general tumor region, the tumor core region, and the enhancing tumor region in the tumor image is performed, that is, more precise positions of the general tumor region, the tumor core region, and the enhancing tumor region are localized in the tumor image.

Figure 13:
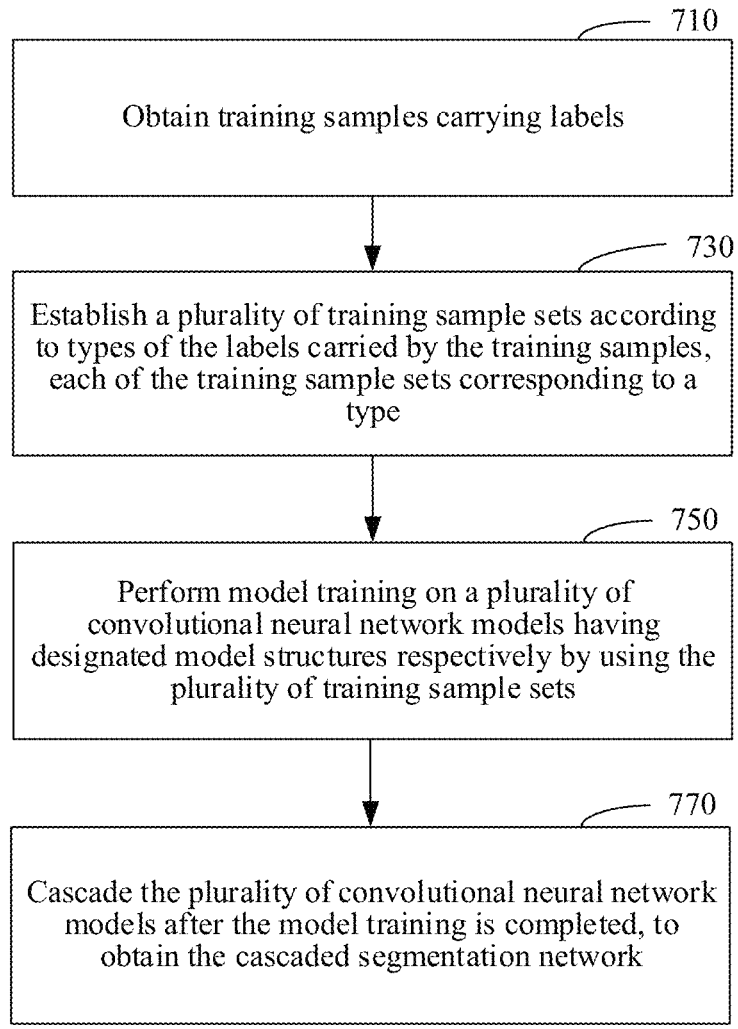
FIG. 13 is a flowchart of another image segmentation method according to one or more embodiments of the present disclosure.

Referring to FIG. 13, in an exemplary embodiment, the method further includes:

constructing the cascaded segmentation network based on the machine learning model, where the machine learning model is a convolutional neural network model.

The constructing the cascaded segmentation network based on the machine learning model may include the following steps:

Step 710: Obtain training samples carrying labels.

The training samples are a tumor images on which the general tumor region, the tumor core region, and the enhancing tumor core region are labeled by using different types of labels.

For brain tumors, labeling refers to only adding non-zero markers to the general tumor region, the tumor core region, or the enhancing tumor core region in the tumor image, and zero markers are made on the pixel points in the other regions in the tumor image.

For example, for the same tumor image, if only non-zero markers are added to the general tumor region in the tumor image, and zero markers are made on the pixel points in the other regions in the tumor image, the marking of the tumor image is performed, and a training sample carrying a general tumor region label is obtained.

If the non-zero markers are only added to the tumor core region in the tumor image, and zero markers are made on the pixel points in the other regions in the tumor image, a training sample carrying a tumor core region label is obtained.

Similarly, if only non-zero markers are added to the enhancing tumor core region in the tumor image, and zero markers are made on the pixel points in the other regions in the tumor image, a training sample carrying an enhancing tumor core region label is obtained.

In certain embodiments, before labeling, the pixel points in the tumor image are normalized, to improve the accuracy of image segmentation.

Step 730: Establish a plurality of training sample sets according to types of the labels carried by the training samples, each of the training sample sets corresponding to a type.

It is to be understood that because tumors have no fixed shape, size and orientation, model training is based on a large number of training samples. Therefore, in this embodiment, for each of the training samples, sample augmentation processing is performed.

The sample augmentation processing includes: flipping, rotating, zooming, contrast enhancement, and the like. The flipping refers to front-and-back flipping and left-and-right flipping of the tumor image; the rotating refers to rotating at a designated angle of the tumor image; the zooming refers to enlarging the tumor image, or shrinking the tumor image; and the contrast enhancement refers to changing contrast of pixel points in the tumor image.

By using the zooming as an example, the enlarging means that a 96×96×96 tumor image is interpolated into a 120×120×120-sized image, and then an intermediate image is cropped from the 120×120×120-sized image to 96×96×96; and the shrinking means that a 120×120×120 tumor image is shrunk to 96×96×96.

A corresponding training sample set is established by using training samples carrying the same type of labels, and then, a plurality of corresponding training sample sets may be established by using training samples of a plurality types of labels. For example, a corresponding training sample set is constructed by using training samples carrying the general tumor region label, and after the model training is performed on the convolutional neural network model, the image segmentation on the general tumor region is performed.

Through such setting, a number of the training samples is effectively expanded, which helps to improve the training value of tumors with different orientations and different shapes and sizes, thereby fully ensuring the accuracy of image segmentation.

Step 750: Perform model training on a plurality of convolutional neural network models having designated model structures respectively by using the plurality of training sample sets.

The model training is essentially to iteratively optimize parameters of the convolutional neural network model with a designated model structure by using the training sample set, so that a designated algorithm function constructed based on the parameters meets a convergence condition.

In this embodiment, the designated model structure is shown in FIG. 10. The designated algorithm function includes but is not limited to: an expectation maximization function, a loss function, and the like.

For example, parameters of the convolutional neural network model are randomly initialized, a probability is calculated through forward propagation according to a current training sample in the training sample set and based on the randomly initialized parameters, a loss function is constructed by using a Dice distance between the calculated probability and correct labeling, and further a loss value of the loss function is calculated.

If the loss value of the loss function does not reach a minimum value, the parameters of the convolutional neural network model are updated through back propagation, a probability is calculated according to a next training sample in the training sample set and based on the updated parameters, the loss function is reconstructed by using the Dice distance between the calculated probability and correct labeling, and the loss value of the reconstructed loss function is calculated again.

Such iterative looping is performed until the loss value of the constructed loss function reaches the minimum value, and the loss function is considered as convergent. In this case, if the convolutional neural network model also converges and meets a preset precision requirement, iteration is stopped.

Otherwise, the parameters of the convolutional neural network model are iteratively updated, and the loss value of the constructed loss function is calculated according to the other training samples in the training sample set and the updated parameters, until the loss function converges.

It is worth mentioning that, if the quantity of times of iterations has reached an iteration threshold before the loss function converges, the iteration also stops, to ensure the model training efficiency.

When the convolutional neural network model converges and meets the preset precision requirement, it indicates that the convolutional neural network model completes the model training, so that the cascaded segmentation network can be further constructed.

Step 770: Cascade the plurality of convolutional neural network models after the model training is performed, to obtain the cascaded segmentation network.

For a plurality of different training sample sets, a plurality of convolutional neural network models that general the model training can be obtained. Each of the convolutional neural network models that complete the model training corresponds to a training sample set. For example, in the training sample set, the training sample is a tumor image on which the general tumor region is labeled by using labels, and then the convolutional neural network model that therefore completes the model training performs image segmentation on the general tumor region.

A convolutional neural network model that completes the model training is used as a level of segmentation network, and a plurality of levels of segmentation networks are cascaded, to construct a cascaded segmentation network. For example, referring back to FIG. 6, the cascaded segmentation network 400 includes the three levels of segmentation networks 401, 402, and 403.

Through the above process, based on the segmentation networks at all levels in the constructed cascaded segmentation network, the segmentation end has an ability to predict classes of the pixel points of the feature map corresponding to the input image.

Therefore, when the input image is inputted to the cascaded segmentation network, class prediction can be performed on the pixel points in the feature map corresponding to the input image, to obtain the classes of the pixel points in the feature map, thereby implementing the image segmentation on the input image.

In an exemplary embodiment, after step 350, the method described above may further include the following steps:

correcting the segmented image by using a morphological algorithm.

The morphological algorithm includes but is not limited to corrosion, expansion, hole filling, Dense CRF (conditional random field), and the like, which is not limited in this embodiment.

As a result, the segmented image is corrected, so that segmentation edges among the general tumor region, the tumor core region, and the enhancing tumor core region in the segmented image are smoothed, and/or, noises in the segmented image are canceled, thereby further effectively improving the segmentation effects of image segmentation.

An image segmentation method is described below with reference to a specific embodiment.

In this specific embodiment, for brain tumors, a segmentation end divides a tumor image segmentation task into a coarse segmentation subtask and a fine segmentation subtask. The tumor image is generated by scanning of an MRI device at an acquisition end, and is essentially a four-modality MM image.

Figure 14:
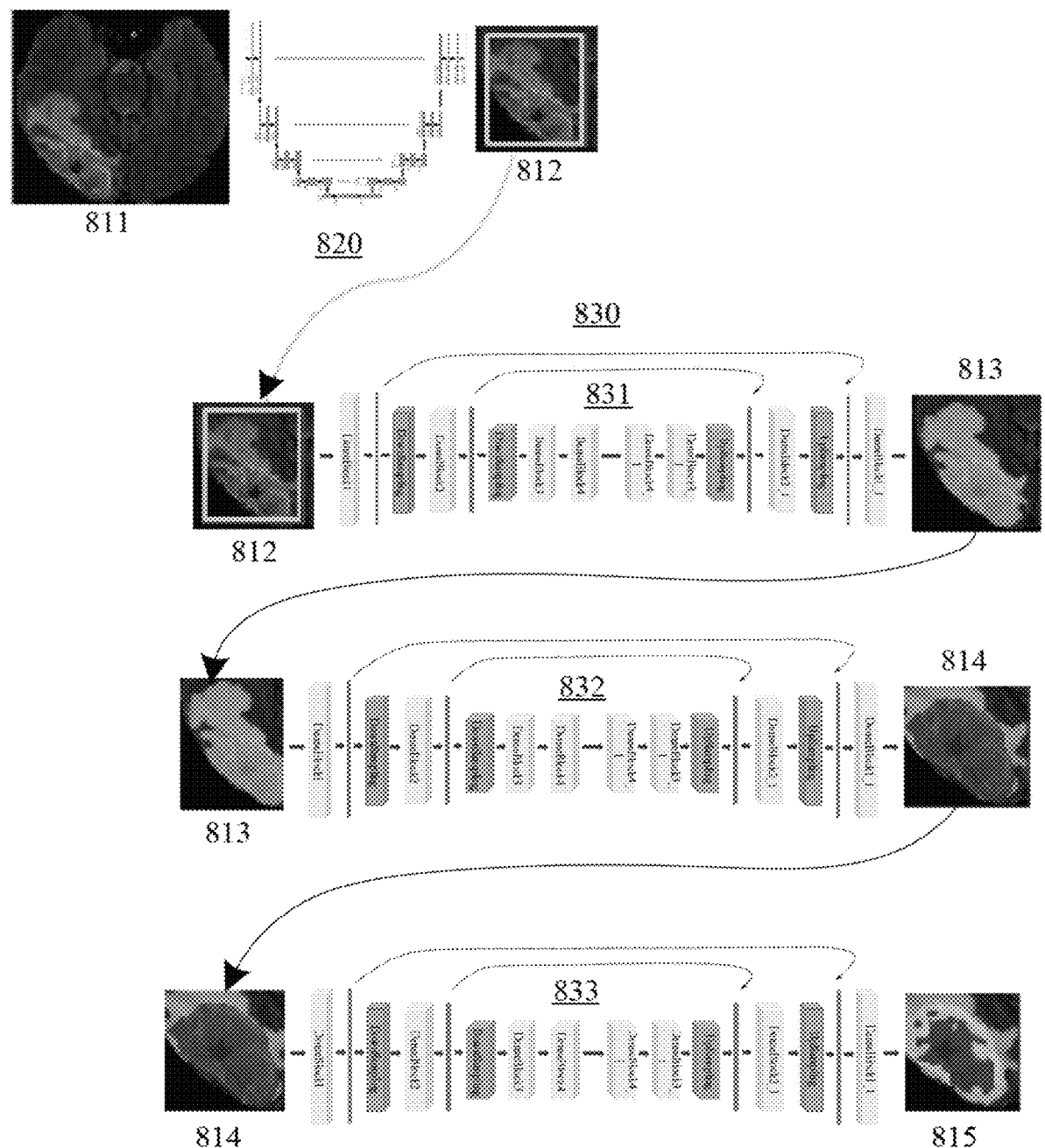
FIG. 14 is a schematic diagram of an implementation of an image segmentation method according to one or more embodiments of the present disclosure.
Figure 15:
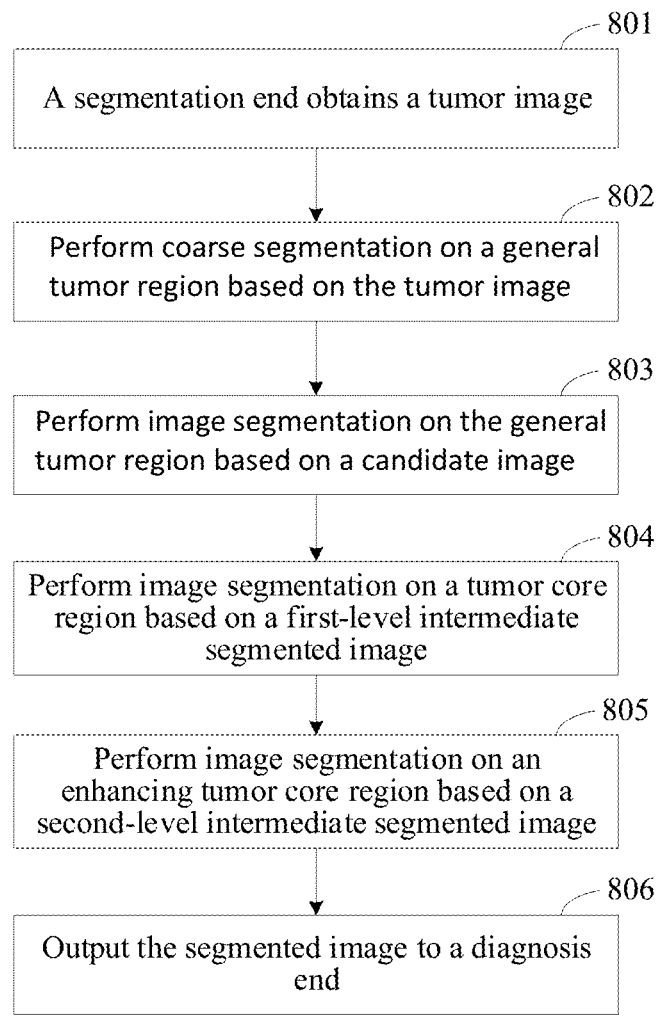
FIG. 15 is a flowchart of the image segmentation method as an addition and/or alternative to the method depicted in FIG. 14.

In certain embodiments, with reference to FIG. 14 and FIG. 15, by performing step 801, the segmentation end obtains a tumor image 811 generated by scanning of the acquisition end.

As shown in FIG. 14, the coarse segmentation subtask is based on the tumor image 811, and tumor localization is performed by using a 3D U-Net network 820, to obtain a candidate image 812 with a general tumor region included in a rectangular frame, so that the coarse segmentation subtask is performed, that is, step 802 is performed: based on the tumor image 811, coarse segmentation on the general tumor region is performed.

In the fine segmentation subtask, the candidate image 812 is used as a basis of the fine segmentation subtask. It can be seen that, a size of the candidate image 812 is greatly reduced compared with that of the tumor image 811.

The candidate image 812 is inputted to a first-level segmentation network 831 in a cascaded segmentation network 830, and image segmentation is performed, to obtain a first-level intermediate segmented image 813 marked with the general tumor region. Compared with the candidate image 812, the general tumor region included in the first-level intermediate segmented image 813 is no longer roughly included in the rectangular frame, but is marked more specifically, and first time of fine segmentation on the tumor image is implemented, that is, step 803 is performed: based on the candidate image 812, image segmentation on the general tumor region is performed.

The first-level intermediate segmented image 813 is used as an input of a second-level segmentation network 832, image segmentation is performed, to obtain a second-level intermediate segmented image 814, the second-level intermediate segmented image 814 reflects a proper inclusion relationship between the general tumor region and the tumor core region, and second time of fine segmentation on the tumor image is implemented, that is, step 804 is performed: based on the first-level intermediate segmented image 813, image segmentation on the tumor core region is performed.

Finally, the second-level intermediate segmented image 814 is used as an input of a third-level segmentation network 833, image segmentation is performed to obtain a segmented image 815, the segmented image 815 reflects a proper inclusion relationship among the general tumor region, the tumor core region, and the enhancing tumor core region, and third time of fine segmentation on the tumor image is implemented, that is, step 805 is performed: based on the second-level intermediate segmented image 814, image segmentation on the enhancing tumor core region is performed.

Therefore, for different characteristics of the three regions included in the brain tumor, the fine segmentation subtasks are performed through stepwise image segmentation, that is, image segmentation on different regions performed based on different input images.

Therefore, for a diagnosis end, by performing step 806, a segmented image 815 obtained by the segmentation end can be received, so that a doctor understands the three regions of different severity degrees in the brain tumor in time, and the doctor is assisted in diagnosing a tumor more rapidly and accurately, for example, analyzing benignity or malignancy or a malignant degree of a tumor of a patient.

A network structure of the 3D U-Net network 810 is shown in FIG. 9, and a network structure of the segmentation networks at all levels in the cascaded segmentation network 830 is shown in FIG. 10.

In upsampling stages and downsampling stages of the segmentation networks at all levels, a structure of dense block layers is shown in FIG. 11, and through a mutual combination of three-dimensional convolution kernels and tangent convolution kernels as well as normal convolution kernels in convolution layers, processes of feature extraction and feature fusion are implemented.

TABLE 1

Settings of a three-dimensional convolution kernel, a tangent convolution kernel, and a normal convolution kernel in a downsampling stage

| Layer | Dense block layer settings |
| --- | --- |
| Dense Block (Second dense block layer) | [3 × 3 × 1 conv] × 3 + [1 × 1 × 3 conv] |
| Pooling (pooling layer) | 3 × 3 × 3 max pool, stride 2 |
| Dense Block (Second dense block layer) | [3 × 3 × 1 conv] × 3 + [1 × 1 × 3 conv] |
| Pooling (pooling layer) | 3 × 3 × 3 max pool, stride 2 |
| Dense Block (First dense block layer) | [3 × 3 × 3 conv] × 12 |
| Dense Block (First dense block layer) | [3 × 3 × 3 conv] × 3 |

By using the downsampling stage as an example, as shown in Table 1, [3×3×1 cony] represents a tangent convolution kernel, [1×1×3 cony] represents a normal convolution kernel, and [3×3×3 cony] represents a three-dimensional convolution kernel. Quantities of various types of convolution kernels that are set in different dense block layers can be flexibly adjusted according to an actual requirement of an application scenario, which is not limited herein. For example, in the present disclosure scenario, in the downsampling stage, 12 three-dimensional convolution kernels and 3 three-dimensional convolution kernels are respectively set in the first dense block layers.

In addition, for a four-modality Mill image, four channels are essentially configured in each of the convolution layers, so that the four-modality Mill image is inputted, through different channels to the cascaded segmentation network, for image segmentation, thereby fully ensuring integrity of the tumor image, and helping to improve the segmentation effects.

Through the above process, end-to-end automatic image segmentation is implemented, that is, as long as different-modality Mill images corresponding to a patient are inputted, three regions with different severity degrees can be obtained, which can not only effectively assist a doctor in further analyzing a treatment plan for the patient, but also determine an operation region for the patient, so as to more accurately process a lesion.

Apparatus embodiments of the present disclosure are described below, and may be used for performing the image segmentation method involved in the present disclosure. For details not disclosed in the apparatus embodiment of the present disclosure, refer to the method embodiment of the image segmentation method involved in the present disclosure.

Figure 16:
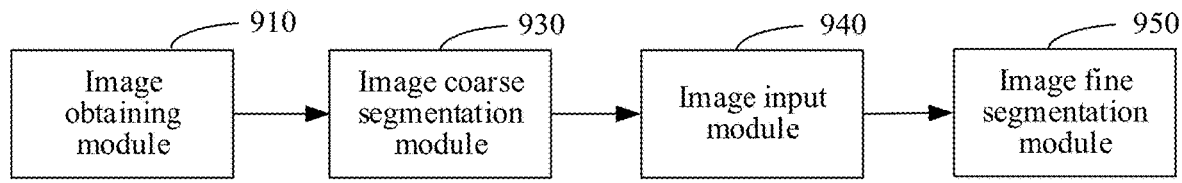
FIG. 16 is a block diagram of an image segmentation apparatus according to one or more embodiments of the present disclosure.

Referring to FIG. 16, in an exemplary embodiment, an image segmentation apparatus 900 includes, but is not limited to: an image obtaining module 910, an image coarse segmentation module 930, an image input module 940, and an image fine segmentation module 950.

The image obtaining module 910 is configured to obtain a tumor image.

The image coarse segmentation module 930 is configured to perform tumor localization on the obtained tumor image, to obtain a candidate image for indicating a position of a general tumor region in the tumor image.

The image input module 940 is configured to input the candidate image to a cascaded segmentation network constructed based on a machine learning model.

The image fine segmentation module 950 is configured to perform image segmentation on the general tumor region in the candidate image starting from a first-level segmentation network in the cascaded segmentation network, and perform image segmentation on an enhancing tumor core region level by level to a last-level segmentation network, to obtain a segmented image.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software. Each module/unit or submodule/subunit can be implemented using one or more processors (or processors and memory). Likewise, a processor (or processor and memory) can be used to implement one or more modules/units or submodules/subunits. Moreover, each module/unit may be developed using a computer programming language, or be part of an overall module/unit that is developed using a computer programming language to encompass the functionalities of each module/unit.

When the image segmentation apparatus provided in the foregoing embodiment performs tumor image segmentation processing, the division of the functional modules is merely used as an example for description. In the practical application, the functions may be distributed to and implemented by different functional modules according to the requirements, that is, an internal structure of the image segmentation apparatus is divided into different functional modules, so as to finish all or some of the functions described above.

In addition, the image segmentation apparatus provided in the foregoing embodiment and the embodiments of the image segmentation method belong to a same ideal. Specific operations manners of the modules have been described in detail in the method embodiment, and the details are not described herein again.

Figure 17:
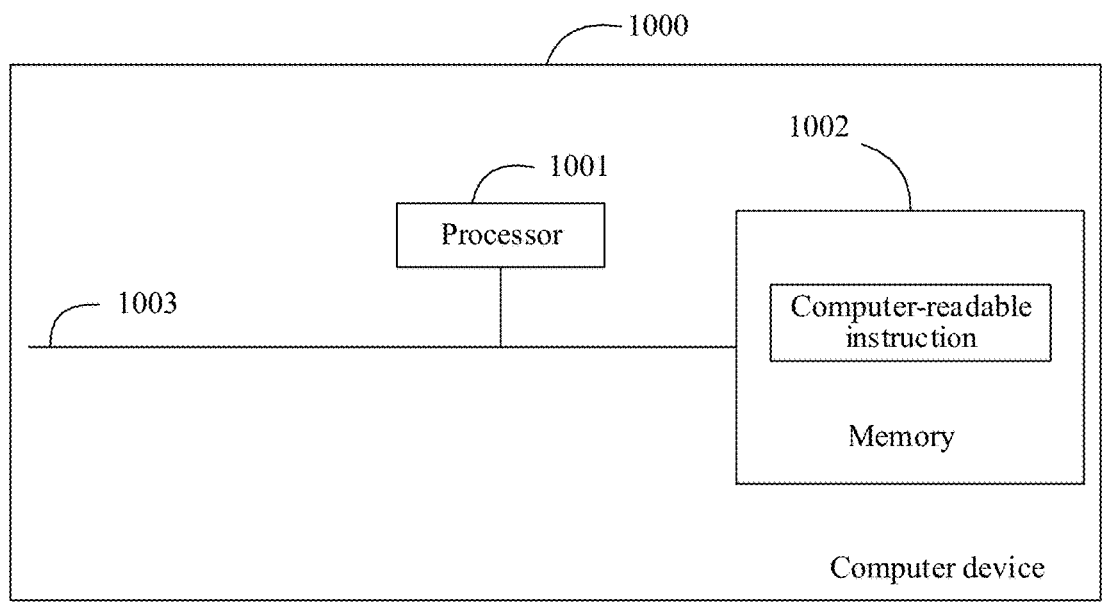
FIG. 17 is a structural block diagram of a computing device according to one or more embodiments of the present disclosure. The computing device may be a computer.

Refer to FIG. 17, in an exemplary embodiment, a computing device 1000 includes at least one processor 1001, at least one memory 1002, and at least one communication bus 1003.

The memory 1002 stores computer-readable instructions, and the processor 1001 reads, by using the communication bus 1003, the computer-readable instructions stored in the memory 1002.

The computer-readable instructions, when executed by the processor 1001, implement the image segmentation method in the foregoing embodiments.

In an exemplary embodiment, a computer-readable storage medium stores a computer program, the computer program, when executed by a processor, implementing the image segmentation method in the foregoing embodiments.

The foregoing descriptions are merely exemplary embodiments of the present disclosure, and are not intended to limit the implementations of the present disclosure. A person of ordinary skill in the art may conveniently make variations or modifications according to the spirit of the present disclosure. Therefore, the protection scope of the present disclosure shall be subject to the protection scope of the claims.

What is claimed is:

1. An image segmentation method, performed by a computing device, the method comprising:
   obtaining a general tumor image;
   performing tumor localization on the tumor image to obtain a candidate image indicating a position of a tumor region in the general tumor image;
   inputting the candidate image to a cascaded segmentation network constructed based on a machine learning model; and
   performing image segmentation on the general tumor region in the candidate image using a first-level segmentation network, a second-level segmentation network and a third-level segmentation network in the cascaded segmentation network to obtain a set of segmented images including a first-level intermediate segmented image, a second-level intermediate segmented image, and a segmented image, wherein an input image and an output image are selecting from the set of segmented images, comprising:
   inputting the input image to a first basic network layer of several first basic network layers in a downsampling stage of the segmentation network, and performing convolution on the input image by using a second dense block layer in the first basic network layer; and
   traversing the other first basic network layers of the several first basic network layers according to a feature propagation sequence, and after the traversal is performed, using features downsampled by a last first basic network layer as intermediate features.

2. The method according to claim 1, wherein the cascaded segmentation network further includes a third-level segmentation network, and wherein performing image segmentation on the tumor region in the candidate image using the first-level segmentation network and the second-level segmentation network in the cascaded segmentation network to obtain the segmented image comprises:
   performing image segmentation on the candidate image using the first-level segmentation network to obtain a first-level intermediate segmented image marked with the general tumor region;
   performing image segmentation on the first-level intermediate segmented image using the second-level segmentation network to obtain a second-level intermediate segmented image marked with the general tumor region and a tumor core region; and
   performing image segmentation on the second-level intermediate segmented image using the third-level segmentation network to obtain the segmented image marked with the general tumor region, the tumor core region, and an enhancing tumor core region.

3. The method according to claim 2, wherein an input image is the candidate image, the first-level intermediate segmented image, or the second-level intermediate segmented image, wherein an output image is the first-level intermediate segmented image, the second-level intermediate segmented image, or the segmented image, wherein the segmentation network includes an upsampling stage and a downsampling stage, and wherein performing image segmentation on the input image by using the segmentation network comprises:
- extracting key features from the input image in the downsampling stage of the segmentation network;
- performing multi-scale feature fusion on the key features in the upsampling stage of the segmentation network to obtain a feature map;
- performing class prediction on pixel points in the feature map to obtain classes of the pixel points in the feature map; and
- marking pixel points of a designated class in the feature map to obtain the output image.

4. The method according to claim 3, wherein extracting key features from the input image in the downsampling stage of the segmentation network comprises:
- inputting the input image to the downsampling stage of the segmentation network and performing convolution and downsampling using several first basic network layers to obtain intermediate features; and
- performing convolution on the intermediate features using the several first dense block layers to obtain the key features.

5. The method according to claim 4, wherein the first basic network layer includes a second dense block layer and a pooling layer, and wherein inputting the input image to the downsampling stage of the segmentation network and performing convolution and downsampling by using the several first basic network layers to obtain intermediate features comprises:
- performing, by using a pooling layer in the first basic network layer, downsampling on features outputted after the convolution, to output the downsampled features to a second first basic network layer.

6. The method according to claim 5, wherein the upsampling stage and the downsampling stage are symmetric to each other, the upsampling stage comprises several third dense block layers and several second basic network layers connected sequentially, and the second basic network layer comprises an upsampling layer and a fourth dense block layer connected sequentially, and wherein inputting the key features to the upsampling stage of the segmentation network and performing multi-scale feature fusion to obtain the feature map comprises:
- inputting the key features to the upsampling stage of the segmentation network, and performing deconvolution by using the several third dense block layers, to obtain first scale features, to input the first scale features to first several second basic network layers;
- performing, in the first several second basic network layers, feature fusion of fourth dense block layers in the first several second basic network layers and second dense block layers in several of the first basic network layers that are symmetric to each other;
- performing, in a last second basic network layer by using an upsampling layer in the last second basic network layer, upsampling on features outputted after the fusion in the first several second basic network layers, to obtain second scale features;
- obtaining features outputted after convolution of the second dense block layers in the several first basic network layers, and using the obtained features as third scale features; and
- performing fusion on the first scale features, the second scale features, and the third scale features by using a fourth dense block layer in the last second basic network layer, and performing deconvolution, to obtain a feature map corresponding to the input image.

7. The method according to claim 6, wherein performing, in the first several second basic network layers, feature fusion of fourth dense block layers in the first several second basic network layers and second dense block layers in several of the first basic network layers that are symmetric to each other comprises:
- inputting the first scale features to a first second basic network layer, and performing upsampling on the inputted first scale features by using an upsampling layer in the first second basic network layer;
- obtaining, based on a fourth dense block layer in the first second basic network layer, features outputted after convolution of a second dense block layer in the several first basic network layers that is symmetric to the fourth dense block layer, and combining the obtained features with the upsampled features, to obtain combined features;
- performing deconvolution on the combined features by using the fourth dense block layer in the first second basic network layer, to output the deconvoluted features to the second second basic network layer; and
- traversing the other second basic network layers in the first several second basic network layers according to a feature propagation sequence, and after the traversal is performed, performing feature fusion of the fourth dense block layers and the second dense block layers that are symmetric to each other.

8. The method according to claim 6, wherein each convolution layer in the first dense block layers and the third dense block layers comprises several three-dimensional convolution kernels; and
- each convolution layers in the second dense block layers and the fourth dense block layers comprises several tangent convolution kernels and several normal convolution kernels.

9. The method according to claim 1, further comprising:
- constructing the cascaded segmentation network based on the machine learning model, wherein the machine learning model is a convolutional neural network model.

10. The method according to claim 9, wherein constructing the cascaded segmentation network based on the machine learning model comprises:
- obtaining training samples carrying labels, wherein the training samples are tumor images on which the general tumor region, the tumor core region, and the enhancing tumor core region are labeled with different types of labels;
- establishing a plurality of training sample sets according to types of the labels carried by the training samples, each of the training sample sets corresponding to a type;
- performing model training on a plurality of convolutional neural network models having designated model structures respectively by using the plurality of training sample sets; and
- cascading the plurality of convolutional neural network models after the model training is performed to obtain the cascaded segmentation network.

11. The method according to claim 1, wherein the performing tumor localization on the tumor image to obtain the candidate image comprises:

extracting a feature map from the tumor image based on a three-dimensional U-shaped fully convolutional neural network;
performing class prediction on pixel points in the feature map corresponding to the tumor image to obtain classes of the pixel points in the feature map; and
obtaining the candidate image on which the general tumor region is accommodated in a designated region according to pixel points belonging to a general tumor region class in the feature map.

12. The method according to claim 11, wherein the three-dimensional U-shaped fully convolutional neural network includes an encoder network and a decoder network, and wherein extracting the feature map from the tumor image comprises:
extracting context features of the tumor image using the encoder network; and
extracting localization features of the general tumor region using the decoder network, and performing feature fusion of the context features and the localization features to obtain the feature map.

13. The method according to claim 12, wherein extracting localization features of the general tumor region using the decoder network and performing feature fusion of the context features and the localization features to obtain the feature map comprises:
performing upsampling on localization features corresponding to a deepest upsampling layer in the decoder network, to obtain to-be-fused features, wherein the localization features corresponding to the deepest upsampling layer are context features corresponding to a deepest downsampling layer in the encoder network;
inputting the to-be-fused features to a second deepest upsampling layer, combining the to-be-fused features with context features corresponding to a second deepest downsampling layer, and obtaining localization features corresponding to the second deepest upsampling layer by performing deconvolution;
traversing the other upsampling layers in descending order of depth, to obtain localization features corresponding to the traversed upsampling layers; and
obtaining the feature map according to localization features corresponding to a shallowest upsampling layer after the traversal is performed.

14. An image segmentation apparatus, comprising: a memory storing computer program instructions; and a processor coupled to the memory and configured to executing the computer program instructions and perform:
obtaining a general tumor image;
performing tumor localization on the tumor image to obtain a candidate image indicating a position of a tumor region in the general tumor image;
inputting the candidate image to a cascaded segmentation network constructed based on a machine learning model; and
performing image segmentation on the general tumor region in the candidate image using a first-level segmentation network, a second-level segmentation network, and a third-level segmentation network in the cascaded segmentation network to obtain a set of segmented images including a first-level intermediate segmented image, a second-level intermediate segmented image, and a segmented image, wherein an input image and an output image are selecting from the set of segmented images, comprising:
inputting the input image to a first basic network layer of several first basic network layers in a downsampling stage of the segmentation network, and performing convolution on the input image by using a second dense block layer in the first basic network layer; and
traversing the other first basic network layers of the several first basic network layers according to a feature propagation sequence, and after the traversal is performed, using features downsampled by a last first basic network layer as intermediate features.

15. The image segmentation apparatus of claim 14, wherein the cascaded segmentation network further includes a third-level segmentation network, and wherein performing image segmentation on the tumor region in the candidate image using the first-level segmentation network and the second-level segmentation network in the cascaded segmentation network to obtain the segmented image comprises:
performing image segmentation on the candidate image using the first-level segmentation network to obtain a first-level intermediate segmented image marked with the general tumor region;
performing image segmentation on the first-level intermediate segmented image using the second-level segmentation network to obtain a second-level intermediate segmented image marked with the general tumor region and a tumor core region; and
performing image segmentation on the second-level intermediate segmented image using the third-level segmentation network to obtain the segmented image marked with the general tumor region, the tumor core region, and an enhancing tumor core region.

16. The image segmentation apparatus of claim 15, wherein an input image is the candidate image, the first-level intermediate segmented image, or the second-level intermediate segmented image, wherein an output image is the first-level intermediate segmented image, the second-level intermediate segmented image, or the segmented image, wherein the segmentation network includes an upsampling stage and a downsampling stage, and wherein performing image segmentation on the input image by using the segmentation network comprises:
extracting key features from the input image in the downsampling stage of the segmentation network;
performing multi-scale feature fusion on the key features in the upsampling stage of the segmentation network to obtain a feature map;
performing class prediction on pixel points in the feature map to obtain classes of the pixel points in the feature map; and
marking pixel points of a designated class in the feature map to obtain the output image.

17. The image segmentation apparatus of claim 16, wherein extracting key features from the input image in the downsampling stage of the segmentation network comprises:
inputting the input image to the downsampling stage of the segmentation network and performing convolution and downsampling using several first basic network layers to obtain intermediate features; and
performing convolution on the intermediate features using the several first dense block layers, to obtain the key features.

18. The image segmentation apparatus of claim 17, wherein the first basic network layer includes a second dense block layer and a pooling layer, and wherein inputting the input image to the downsampling stage of the segmentation network and performing convolution and downsampling by using the several first basic network layers to obtain intermediate features comprises:

performing, by using a pooling layer in the first basic network layer, downsampling on features outputted after the convolution, to output the downsampled features to a second first basic network layer.

19. The image segmentation apparatus of claim 18, wherein the upsampling stage and the downsampling stage are symmetric to each other, the upsampling stage comprises several third dense block layers and several second basic network layers connected sequentially, and the second basic network layer comprises an upsampling layer and a fourth dense block layer connected sequentially, and wherein inputting the key features to the upsampling stage of the segmentation network and performing multi-scale feature fusion to obtain the feature map comprises:

inputting the key features to the upsampling stage of the segmentation network, and performing deconvolution by using the several third dense block layers, to obtain first scale features, to input the first scale features to first several second basic network layers;

performing, in the first several second basic network layers, feature fusion of fourth dense block layers in the first several second basic network layers and second dense block layers in several of the first basic network layers that are symmetric to each other;

performing, in a last second basic network layer by using an upsampling layer in the last second basic network layer, upsampling on features outputted after the fusion in the first several second basic network layers, to obtain second scale features;

obtaining features outputted after convolution of the second dense block layers in the several first basic network layers, and using the obtained features as third scale features; and performing fusion on the first scale features, the second scale features, and the third scale features by using a fourth dense block layer in the last second basic network layer, and performing deconvolution, to obtain a feature map corresponding to the input image.

20. A non-transitory computer-readable storage medium storing computer program instructions executable by at least one processor to perform:

obtaining a general tumor image;

performing tumor localization on the tumor image to obtain a candidate image indicating a position of a tumor region in the general tumor image;

inputting the candidate image to a cascaded segmentation network constructed based on a machine learning model; and performing image segmentation on the general tumor region in the candidate image using a first-level segmentation network, a second-level segmentation network and a third-level segmentation network in the cascaded segmentation network to obtain a set of segmented images including a first-level intermediate segmented image, a second-level intermediate segmented image, and a segmented image, wherein an input image and an output image are selecting from the set of segmented images, comprising:

inputting the input image to a first basic network layer of several first basic network layers in a downsampling stage of the segmentation network, and performing convolution on the input image by using a second dense block layer in the first basic network layer; and traversing the other first basic network layers of the several first basic network layers according to a feature propagation sequence, and after the traversal is performed, using features downsampled by a last first basic network layer as intermediate features.

* * * * *